US012306329B2

(12) United States Patent
Hoshihara et al.

(10) Patent No.: US 12,306,329 B2
(45) Date of Patent: May 20, 2025

(54) RADIO WAVE SENSOR AND OCCUPANT DETECTION DEVICE

(71) Applicant: Mitsubishi Electric Corporation, Tokyo (JP)

(72) Inventors: Yasunori Hoshihara, Tokyo (JP); Takumi Takei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/035,050

(22) PCT Filed: Jan. 29, 2021

(86) PCT No.: PCT/JP2021/003134
§ 371 (c)(1),
(2) Date: May 2, 2023

(87) PCT Pub. No.: WO2022/162852
PCT Pub. Date: Aug. 4, 2022

(65) Prior Publication Data
US 2024/0012100 A1    Jan. 11, 2024

(51) Int. Cl.
*G01S 7/03*  (2006.01)
*G01S 13/04*  (2006.01)

(52) U.S. Cl.
CPC ............. *G01S 7/032* (2013.01); *G01S 13/04* (2013.01)

(58) Field of Classification Search
CPC ........ G01S 13/931; G01S 13/04; G01S 13/56; G01S 2013/0245; G01S 2013/0254; H01Q 1/3233; B60N 2/022

(Continued)

(56) References Cited

U.S. PATENT DOCUMENTS 6,598,900 B2 *  7/2003  Stanley ............. B60R 21/01534
                                                    701/45
8,604,968 B2 * 12/2013  Alland .................. G01S 13/867
                                                    342/22

(Continued)

FOREIGN PATENT DOCUMENTS

CN    108732568 A    11/2018
CN    110363059 A    10/2019

(Continued)

OTHER PUBLICATIONS

International Search Report for PCT/JP2021/003134 filed on Jan. 29, 2021 and mailed on Apr. 6, 2021.

(Continued)

*Primary Examiner* — Vladimir Magloire
*Assistant Examiner* — Michael W Justice
(74) *Attorney, Agent, or Firm* — BIRCH, STEWART, KOLASCH & BIRCH, LLP

(57) ABSTRACT

A radio wave sensor includes: a transmission antenna that emits a radio wave toward a presence allowable area which is an area in which an occupant can be present in an area in a vehicle interior of a vehicle; and a reception antenna including a plurality of reception antenna elements that receives a reflection wave of the radio wave emitted from the transmission antenna. The positions where the plurality of reception antenna elements are arranged in a vehicle width direction of the vehicle are different from each other.

19 Claims, 17 Drawing Sheets

(58) Field of Classification Search
USPC .......................................................... 342/27
See application file for complete search history.

(56) References Cited

U.S. PATENT DOCUMENTS

| | | | | |
|---|---|---|---|---|
| 9,575,170 | B2* | 2/2017 | Kurono | G01S 13/42 |
| 9,995,822 | B2* | 6/2018 | Baftiu | G01S 13/931 |
| 10,481,249 | B2* | 11/2019 | Alenljung | G01S 7/354 |
| 10,634,775 | B2* | 4/2020 | Loesch | G01S 13/003 |
| 11,199,619 | B2* | 12/2021 | Kishigami | G01S 13/42 |
| 11,254,284 | B2* | 2/2022 | Sung | B60N 2/002 |
| 11,791,543 | B2* | 10/2023 | Lee | G01S 7/03 342/195 |
| 2002/0003345 | A1* | 1/2002 | Stanley | B60R 21/01532 280/728.1 |
| 2011/0163904 | A1* | 7/2011 | Alland | B60R 11/04 342/52 |
| 2014/0062762 | A1* | 3/2014 | Kurono | G01S 7/354 342/146 |
| 2014/0368375 | A1* | 12/2014 | Baftiu | H01Q 17/00 342/70 |
| 2016/0285172 | A1* | 9/2016 | Kishigami | G01S 7/023 |
| 2017/0139042 | A1* | 5/2017 | Alenljung | G01S 7/354 |
| 2017/0307744 | A1* | 10/2017 | Loesch | H01Q 21/296 |
| 2018/0088224 | A1* | 3/2018 | Kishigami | G01S 13/46 |
| 2018/0306917 | A1* | 10/2018 | Fekete | G01S 15/42 |
| 2019/0293777 | A1* | 9/2019 | Takemoto | G01S 7/415 |
| 2019/0366965 | A1* | 12/2019 | Ben Khadhra | G01S 13/04 |
| 2020/0103495 | A1* | 4/2020 | Iwasa | G01S 13/325 |
| 2020/0225337 | A1* | 7/2020 | Kishigami | G01S 7/41 |
| 2020/0327344 | A1* | 10/2020 | Nakagawa | G06T 7/00 |
| 2021/0076971 | A1* | 3/2021 | Oloumi | A61B 5/1116 |
| 2021/0078529 | A1* | 3/2021 | Sung | B60R 22/48 |
| 2021/0149021 | A1* | 5/2021 | Pinnock | G01S 7/4034 |
| 2022/0163623 | A1* | 5/2022 | Kishigami | H01Q 21/065 |
| 2022/0209396 | A1* | 6/2022 | Lee | G01S 13/42 |
| 2022/0212658 | A1* | 7/2022 | Nagata | B60R 21/01512 |
| 2023/0411836 | A1* | 12/2023 | Lee | G01S 7/41 |

FOREIGN PATENT DOCUMENTS

| | | |
|---|---|---|
| JP | 2001-289940 A | 10/2001 |
| JP | 2017-181225 A | 10/2017 |
| JP | 2019-123354 A | 7/2019 |
| JP | 2019-168379 A | 10/2019 |
| JP | 2020-101415 A | 7/2020 |
| KR | 10-2019-0079060 A | 7/2019 |
| WO | WO 2019/238575 A1 | 12/2019 |
| WO | WO 2020/189116 A1 | 9/2020 |

OTHER PUBLICATIONS

Decision to Grant a Patent issued in JP2022-577932, mailed Jun. 13, 2023, with English translation.
Chinese Office Action and Search Report for Chinese Application No. 202180091370.9, dated Feb. 1, 2024, with an English translation.
German Office Action for German Application No. 11 2021 006 950.0, dated May 17, 2024, with an English translation.
Chinese Office Action for Chinese Application No. 202180091370.9, dated Dec. 5, 2024, with English translation.
Chinese Office Action and Search Report for Chinese Application No. 202180091370.9, dated Sep. 16, 2024, with English translation.
Chinese Office Action for Chinese Application No. 202180091370.9, dated Feb. 20, 2025, with English translation.

* cited by examiner

RADIO WAVE SENSOR AND OCCUPANT DETECTION DEVICE

TECHNICAL FIELD

The present disclosure relates to a radio wave sensor and an occupant detection device.

BACKGROUND ART

Patent Literature 1 discloses an occupant detection device that detects an occupant in a vehicle. The occupant detection device includes a first sensor disposed on the ceiling in a vehicle interior near the windshield, and a second sensor disposed on the ceiling in the vehicle interior near a rear seat. The first sensor is an image sensor (hereinafter, referred to as a "first image sensor") that captures an image of an area including a front seat, and the second sensor is an image sensor (hereinafter, referred to as "second image sensor") that captures an image of an area including the rear seat.

When the front seat is viewed from the first image sensor, an area on a back side of the front seat is a blind spot of the first image sensor. When an occupant sitting on the rear seat is an adult or the like having a high sitting height, the face or the like of the occupant is out of a range of the blind spot of the first image sensor, and the face or the like of the occupant may appear in a captured image of the first image sensor. However, when the occupant sitting on the rear seat is a child or the like having a low sitting height, almost the entire occupant is within the range of the blind spot of the first image sensor, and there is a possibility that the face or the like of the occupant does not appear in a captured image of the first image sensor. The occupant detection device includes the second image sensor so as to be able to detect a child or the like sitting on the rear seat.

CITATION LIST

Patent Literature

Patent Literature 1: JP 2019-123354 A

SUMMARY OF INVENTION

Technical Problem

The occupant detection device disclosed in Patent Literature 1 has a problem that a plurality of image sensors needs to be disposed in order to detect all occupants in a vehicle and to identify positions of all the occupants.

The present disclosure has been made in order to solve the above problem, and an object of the present disclosure is to obtain a radio wave sensor that can detect all occupants in a vehicle and can identify positions of all the occupants.

Solution to Problem

A radio wave sensor according to the present disclosure includes: a transmission antenna including a plurality of transmission antenna elements to emit a radio wave toward a presence allowable area which is an area in which an occupant is present in an area in a vehicle interior of a vehicle; and a reception antenna including a plurality of reception antenna elements to receive a reflection wave of the radio wave emitted from the transmission antenna, wherein positions where at least some of the plurality of transmission antenna elements are arranged are different from each other at least in one direction out of a vehicle height direction of the vehicle and a vehicle width direction of the vehicle, and positions where at least some of the plurality of reception antenna elements are arranged are different from each other at least in the other direction different from the one direction out of the vehicle height direction of the vehicle and the vehicle width direction of the vehicle.

Advantageous Effects of Invention

According to the present disclosure, it is possible to detect all occupants in a vehicle and to identify positions of all the occupants.

DESCRIPTION OF EMBODIMENTS

Hereinafter, in order to describe the present disclosure in more detail, embodiments for carrying out the present disclosure will be described with reference to the attached drawings.

First Embodiment

Figure 1:
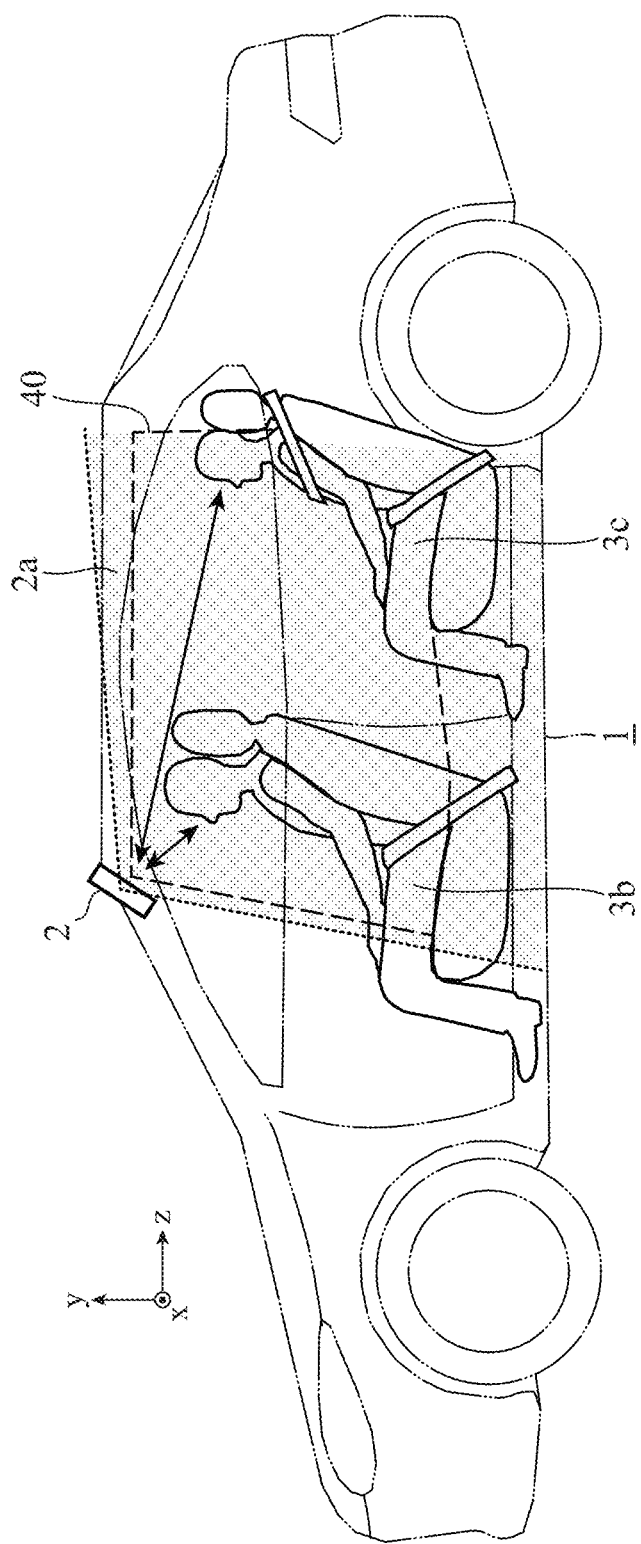
FIG. 1 is a side view illustrating a vehicle 1 to which a radio wave sensor 2 according to a first embodiment is attached.

FIG. 1 is a side view illustrating a vehicle 1 to which a radio wave sensor 2 according to a first embodiment is attached.

Figure 2:
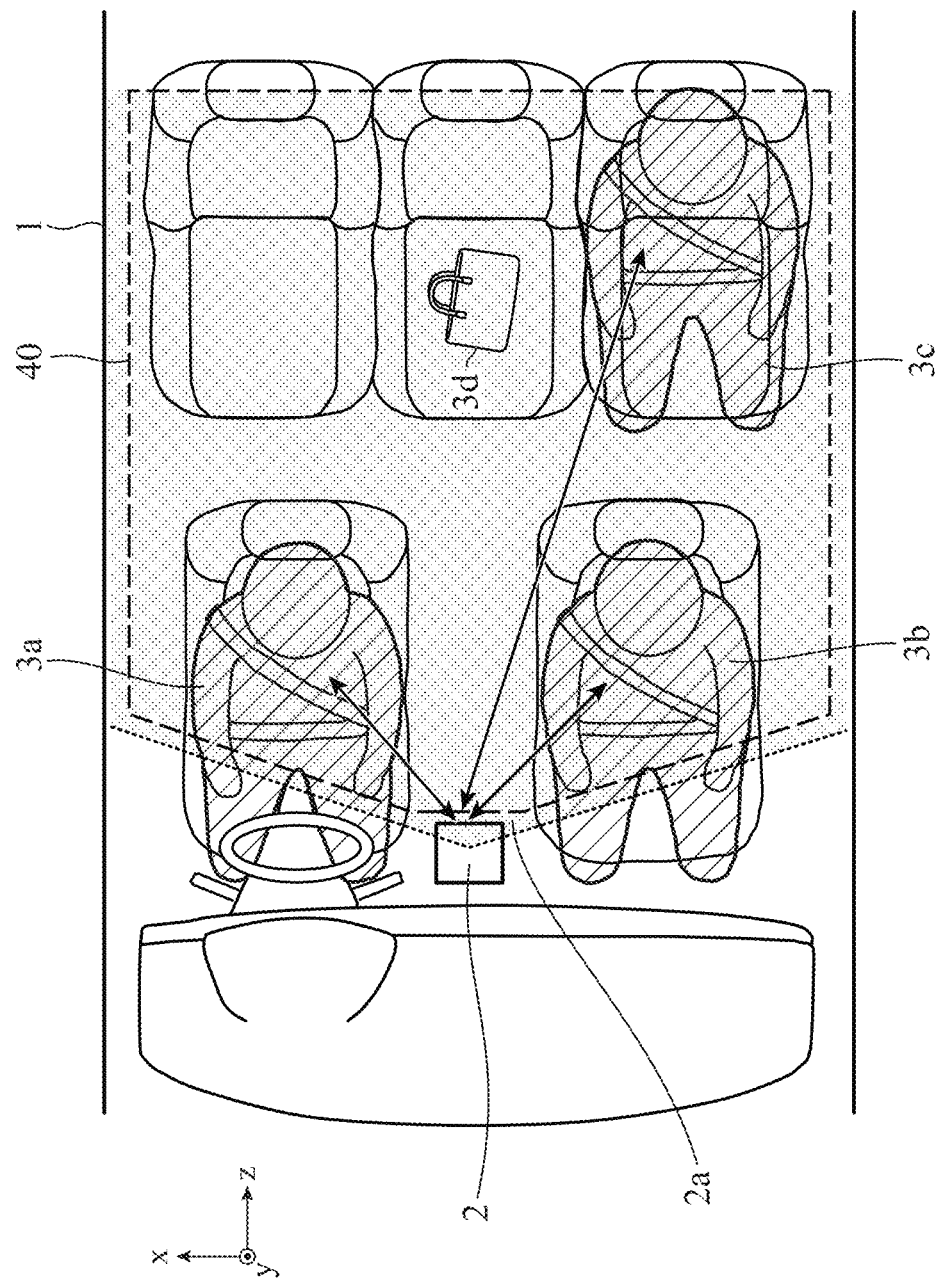
FIG. 2 is a top view illustrating the vehicle 1 to which the radio wave sensor 2 according to the first embodiment is attached.

FIG. 2 is a top view illustrating the vehicle 1 to which the radio wave sensor 2 according to the first embodiment is attached.

Among the three-dimensional coordinate axes in FIGS. 1 and 2, the x-axis is an axis parallel to a vehicle width direction of the vehicle 1, the y-axis is an axis parallel to a vehicle height direction of the vehicle 1, and the z-axis is an axis parallel to a vehicle length direction of the vehicle 1.

The radio wave sensor 2 is disposed on the ceiling in a vehicle interior.

The radio wave sensor 2 emits a radio wave toward the vehicle interior of the vehicle 1, receives a reflection wave of the radio wave, and detects occupants 3a, 3b, and 3c present in the vehicle interior on the basis of the reflection wave.

An irradiation range 2a of the radio wave emitted from the radio wave sensor 2 includes an area where an occupant can be present (hereinafter, referred to as "presence allowable area") 40 in an area in the vehicle interior of the vehicle 1.

The vehicle 1 includes front seats and rear seats, and an occupant can sit on the front seat or rear seat. Thus, the presence allowable area 40 is an area including a space occupied by an occupant when the occupant is sitting on the front seat and a space occupied by an occupant when the occupant is sitting on the rear seat.

In the vehicle 1 illustrated in FIGS. 1 and 2, the radio wave sensor 2 is disposed on the ceiling in the vehicle interior near the windshield. However, this is merely an example, and the radio wave sensor 2 may be disposed on the ceiling closer to the rear seat than the windshield.

In addition, the radio wave sensor 2 only needs to be disposed at a position closer to the ceiling than heads of the occupants 3a, 3b, and 3c present in the vehicle interior, and the radio wave sensor 2 may be disposed in, for example, a rear view mirror.

The occupants 3a, 3b, and 3c are present in the presence allowable area 40 included in the radio wave irradiation range 2a.

In the vehicle 1 illustrated in FIGS. 1 and 2, a part of a lower body of each of the occupants 3a, 3b, and 3c is not included in the presence allowable area 40. However, this is merely an example, and the entire body of each of the occupants 3a, 3b, and 3c may be included in the presence allowable area 40.

The occupant 3a is sitting on the driver's seat out of the front seats of the vehicle.

The occupant 3b is sitting on the assistant driver's seat out of the front seats of the vehicle.

The occupant 3c is sitting on a rear seat of the vehicle.

A bag 3d is a reflection object other than the occupants, and is placed substantially at the center of the rear seats.

Figure 3:
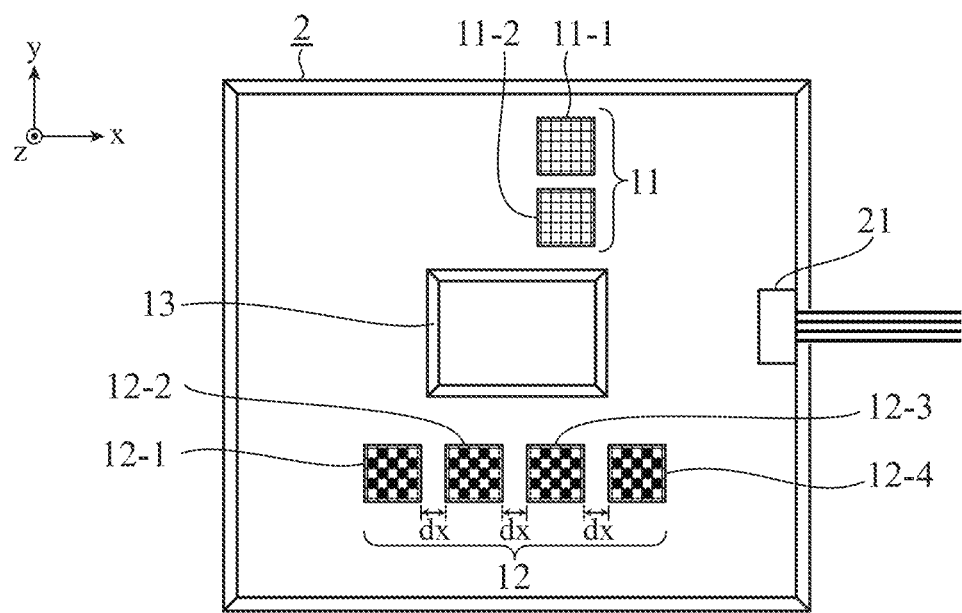
FIG. 3 is a configuration diagram illustrating the radio wave sensor 2 according to the first embodiment.

FIG. 3 is a configuration diagram illustrating the radio wave sensor 2 according to the first embodiment.

Figure 4:
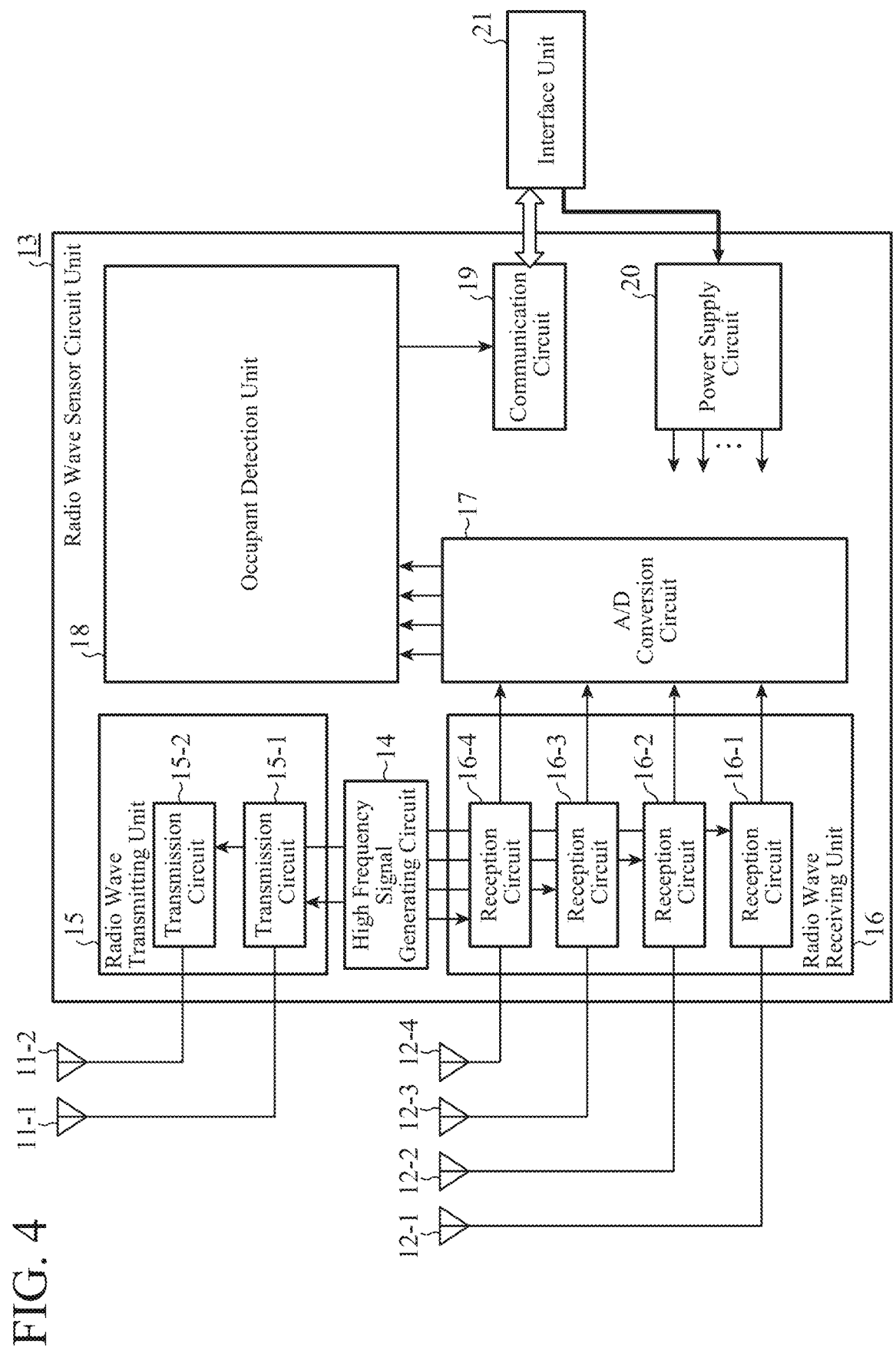
FIG. 4 is a block diagram illustrating a function of the radio wave sensor 2 according to the first embodiment.

FIG. 4 is a block diagram illustrating a function of the radio wave sensor 2 according to the first embodiment.

Among the three-dimensional coordinate axes in FIG. 3, the x-axis is an axis parallel to a vehicle width direction of the vehicle 1, the y-axis is an axis parallel to a vehicle height direction of the vehicle 1, and the z-axis is an axis parallel to a vehicle length direction of the vehicle 1.

A transmission antenna 11 is a planar antenna mounted on an electronic circuit board.

The transmission antenna 11 includes a plurality of transmission antenna elements 11-1 and 11-2 that emits a radio wave toward the presence allowable area 40.

In the radio wave sensor 2 illustrated in FIG. 3, for example, a millimeter wave of 60 GHz is used as the radio wave emitted from the transmission antenna 11. However, this is merely an example, and for example, a quasi-millimeter wave of 24 GHz may be used as the radio wave emitted from the transmission antenna 11.

Positions where the transmission antenna elements 11-1 and 11-2 are arranged in the vehicle height direction of the vehicle 1 are different from each other.

In the radio wave sensor 2 illustrated in FIG. 3, the transmission antenna element 11-1 is disposed at a position higher than the transmission antenna element 11-2 in the vehicle height direction.

A reception antenna 12 is a planar antenna mounted on an electronic circuit board, and is disposed on the same plane as the transmission antenna 11. However, the same plane here does not mean that the plane on which the transmission antenna 11 is disposed and the plane on which the reception antenna 12 is disposed are strictly the same as each other, and includes planes different from each other as long as there is no practical problem.

The reception antenna 12 includes a plurality of reception antenna elements 12-1 to 12-4 that receives a reflection wave of the radio wave emitted from the transmission antenna 11.

Positions where the reception antenna elements 12-1 to 12-4 are arranged in the vehicle width direction of the vehicle 1 are different from each other.

In the radio wave sensor 2 illustrated in FIG. 3, among the reception antenna elements 12-1 to 12-4, the reception antenna element 12-1 is disposed closest to the assistant driver's seat, and the reception antenna element 12-4 is disposed closest to the driver's seat.

A radio wave sensor circuit unit 13 includes a high frequency signal generating circuit 14, a radio wave transmitting unit 15, a radio wave receiving unit 16, an analog/digital conversion circuit (hereinafter, referred to as "A/D conversion circuit") 17, an occupant detection unit 18, a communication circuit 19, and a power supply circuit 20.

The high frequency signal generating circuit 14 generates a frequency modulation (FM) signal whose frequency changes with a lapse of time as a sensing signal, and outputs the FM signal to each of the radio wave transmitting unit 15 and the radio wave receiving unit 16.

In the radio wave sensor 2 illustrated in FIG. 3, a frequency modulation-continuous wave (FM-CW) method is used as a modulation method, and the high frequency signal generating circuit 14 generates an FM signal. However, the modulation method is not limited to the FM-CW method, and for example, a fast-chirp modulation (FCM) method may be used. When the FCM method is used as the modulation method, the high frequency signal generating circuit 14 generates an FCM signal and outputs the FCM signal to each of the radio wave transmitting unit 15 and the radio wave receiving unit 16.

The radio wave transmitting unit 15 includes a transmission circuit 15-1 and a transmission circuit 15-2.

The radio wave transmitting unit 15 emits a radio wave from either one of the transmission antenna element 11-1 and the transmission antenna element 11-2 toward the presence allowable area 40.

That is, the radio wave transmitting unit 15 sequentially switches one transmission antenna element that emits a radio wave out of the transmission antenna element 11-1 and the transmission antenna element 11-2.

When a radio wave is emitted from the transmission antenna element 11-1, the radio wave transmitting unit 15 outputs an FM signal from the transmission circuit 15-1 to the transmission antenna element 11-1. When a radio wave is emitted from the transmission antenna element 11-2, the radio wave transmitting unit 15 outputs an FM signal from the transmission circuit 15-2 to the transmission antenna element 11-2.

The transmission circuit 15-1 amplifies an FM signal output from the high frequency signal generating circuit 14 and outputs the amplified FM signal to the transmission antenna element 11-1, thereby emitting an FM transmission wave which is a radio wave from the antenna element 11-1 toward the presence allowable area 40.

The transmission circuit 15-2 amplifies an FM signal output from the high frequency signal generating circuit 14 and outputs the amplified FM signal to the transmission antenna element 11-2, thereby emitting an FM transmission wave from the antenna element 11-2 toward the presence allowable area 40.

The radio wave receiving unit 16 includes reception circuits 16-1 to 16-4.

When an FM reception wave which is a reflection wave is received by the reception antenna element 12-$m$, the reception circuit 16-$m$ ($m$=1, 2, 3, or 4) acquires a reception signal of the FM reception wave from the reception antenna element 12-$m$.

The reception circuit 16-$m$ extracts a difference (hereinafter, referred to as "frequency difference") $f_d$ between the frequency of the FM signal output from the high frequency signal generating circuit 14 and the frequency of the reception signal.

The reception circuit 16-$m$ generates an intermediate frequency signal $IF_m$ having the frequency difference $f_d$, and outputs the intermediate frequency signal $IF_m$ to the A/D conversion circuit 17.

The A/D conversion circuit 17 converts the intermediate frequency signal $IF_m$ output from the reception circuit 16-$m$ ($m$=1, 2, 3, or 4) from an analog signal to a digital signal $D_m$.

The A/D conversion circuit 17 outputs the digital signal $D_m$ to the occupant detection unit 18.

The occupant detection unit 18 is implemented by, for example, a digital signal processing circuit.

The occupant detection unit 18 acquires the digital signal $D_m$ related to the FM reception wave received by the reception circuit 16-$m$ ($m$=1, 2, 3, or 4) from the A/D conversion circuit 17.

The occupant detection unit 18 detects the occupants 3$a$, 3$b$, and 3$c$ present in the presence allowable area 40 on the basis of the digital signal $D_m$ ($m$=1, 2, 3, or 4).

In addition, the occupant detection unit 18 identifies positions where the detected occupants 3$a$, 3$b$, and 3$c$ are sitting on the basis of the digital signal $D_m$ ($m$=1, 2, 3, or 4).

Furthermore, the occupant detection unit 18 determines whether the detected occupants 3$a$, 3$b$, and 3$c$ are adults or children on the basis of the digital signal $D_m$.

The occupant detection unit 18 outputs detection data indicating detection results of the occupants 3$a$, 3$b$, and 3$c$ present in the vehicle interior, positions where the occupants 3$a$, 3$b$, and 3$c$ are sitting, and a determination result as to whether or not the occupants 3$a$, 3$b$, and 3$c$ are adults to the communication circuit 19.

The digital signal processing circuit is implemented by, for example, a single circuit, a composite circuit, a programmed processor, a parallel programmed processor, an application specific integrated circuit (ASIC), a field-programmable gate array (FPGA), or a combination thereof.

The digital signal processing circuit is not limited to one implemented by dedicated hardware, and may be implemented by software, firmware, or a combination of software and firmware.

The software or firmware is stored as a program in a memory of a computer. The computer means hardware for executing a program. For example, a central processing unit (CPU), a central processing device, a processing device, an arithmetic device, a microprocessor, a microcomputer, a processor, or a digital signal processor (DSP) corresponds to the computer.

The communication circuit 19 transfers the detection data output from the occupant detection unit 18 to a control unit (not illustrated) or the like in the vehicle interior via an interface unit 21 described later.

The power supply circuit 20 receives power supply from the control unit (not illustrated) or the like via the interface unit 21.

The power supply circuit 20 distributes the received power as driving power to the high frequency signal generating circuit 14, the radio wave transmitting unit 15, the radio wave receiving unit 16, the A/D conversion circuit 17, the occupant detection unit 18, and the communication circuit 19.

The interface unit 21 is an interface for connecting the radio wave sensor circuit unit 13 to the control unit (not illustrated) or the like.

Next, an operation of the radio wave sensor 2 will be described.

As a sensing signal of the radio wave sensor 2, a signal modulated by various modulation methods can be used. However, here, an example of using a signal modulated by the FM-CW method will be described.

Figure 5:
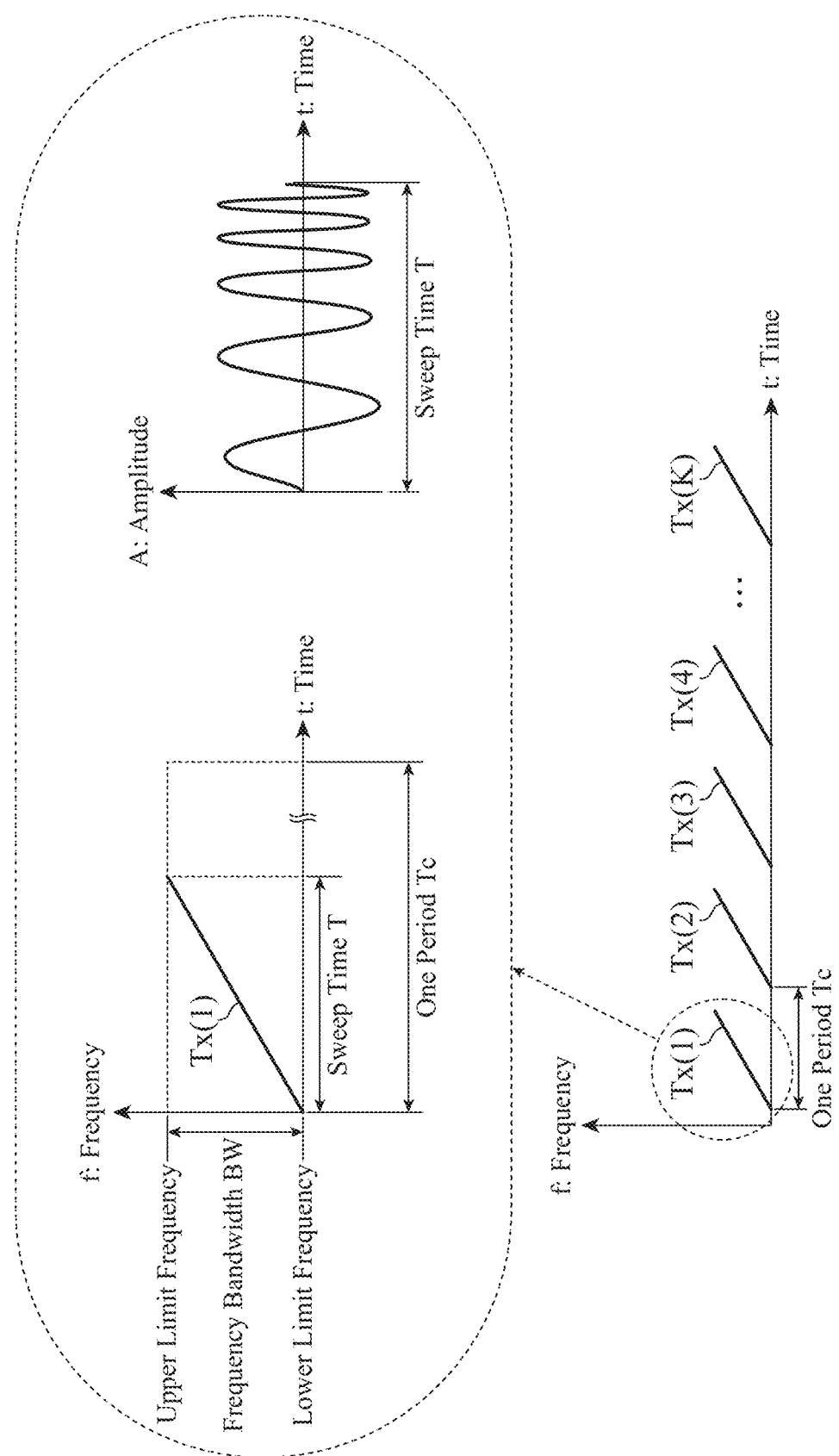
FIG. 5 is an explanatory diagram illustrating an example of an FM signal Tx(k) generated by a high frequency signal generating circuit 14.

As illustrated in FIG. 5, the high frequency signal generating circuit 14 generates an FM signal Tx($k$) ($k$=1, . . . , or K) whose frequency changes with time as a sensing signal. K is an integer equal to or more than 2.

FIG. 5 is an explanatory diagram illustrating an example of the FM signal Tx($k$) generated by the high frequency signal generating circuit 14.

In the FM signal Tx(k) illustrated in FIG. 5, the initial state of the frequency is a lower limit frequency, and the frequency increases with time until the frequency reaches an upper limit frequency.

In FIG. 5, the sweep time T is a time until the frequency of the FM signal Tx(k) reaches the upper limit frequency from the lower limit frequency, and the frequency bandwidth BW is a frequency of a difference between the upper limit frequency and the lower limit frequency.

In the example of FIG. 5, the FM signal Tx(k) is generated K times at a constant period $T_c$.

The high frequency signal generating circuit 14 outputs the FM signal Tx(k) to the transmission circuits 15-1 and 15-2 of the radio wave transmitting unit 15, and outputs the FM signal Tx(k) to the reception circuits 16-1 to 16-4 of the radio wave receiving unit 16.

FIG. 5 also illustrates an amplitude waveform of the FM signal Tx(k).

The transmission circuit 15-1 and the transmission circuit 15-2 alternately perform an output operation of the FM signal Tx(k).

When receiving the FM signal Tx(k) from the high frequency signal generating circuit 14 at a timing of performing the output operation of the FM signal Tx(k), the transmission circuit 15-1 amplifies the FM signal Tx(k) and outputs the amplified FM signal Tx(k) to the transmission antenna element 11-1.

By the amplified FM signal Tx(k) being output from the transmission circuit 15-1 to the transmission antenna element 11-1, an FM transmission wave is emitted from the transmission antenna element 11-1 toward the presence allowable area 40.

The transmission circuit 15-2 stops the output operation of the FM signal Tx(k) while the transmission circuit 15-1 is performing the output operation of the FM signal Tx(k).

A timing at which the transmission circuit 15-1 performs the output operation of the FM signal Tx(k) is, for example, k=1, 3, 5 . . . .

When receiving the FM signal Tx(k) from the high frequency signal generating circuit 14 at a timing of performing the output operation of the FM signal Tx(k), the transmission circuit 15-2 amplifies the FM signal Tx(k) and outputs the amplified FM signal Tx(k) to the transmission antenna element 11-2.

By the amplified FM signal Tx(k) being output from the transmission circuit 15-2 to the transmission antenna element 11-2, an FM transmission wave is emitted from the transmission antenna element 11-2 toward the presence allowable area 40.

The transmission circuit 15-1 stops the output operation of the FM signal Tx(k) while the transmission circuit 15-2 is performing the output operation of the FM signal Tx(k).

A timing at which the transmission circuit 15-2 performs the output operation of the FM signal Tx(k) is, for example, k=2, 4, 6 . . . .

Figure 6:
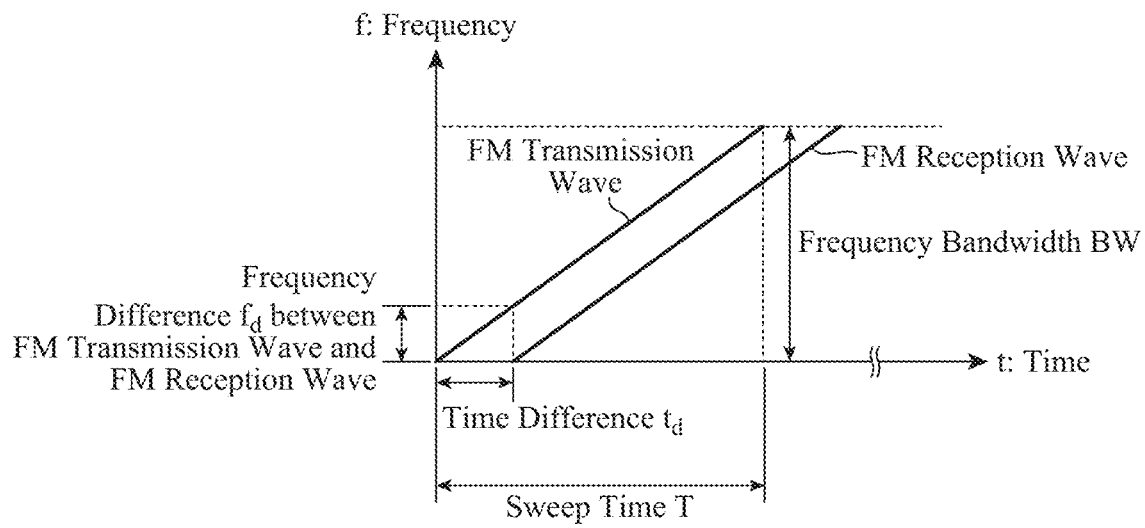
FIG. 6 is an explanatory diagram illustrating an example of an FM transmission wave and an FM reception wave.

When receiving the FM signal Tx(k) from the transmission circuit 15-1, as illustrated in FIG. 6, the transmission antenna element 11-1 emits an FM transmission wave whose frequency temporally transitions toward the presence allowable area 40.

When receiving the FM signal Tx(k) from the transmission circuit 15-2, the transmission antenna element 11-2 emits the FM transmission wave as illustrated in FIG. 6 toward the presence allowable area 40.

FIG. 6 is an explanatory diagram illustrating an example of the FM transmission wave and the FM reception wave.

The FM transmission wave emitted from each of the transmission antenna element 11-1 and the transmission antenna element 11-2 is reflected by the occupants 3a, 3b, and 3c present in the presence allowable area 40.

When the FM transmission wave is emitted to a structure or the like in the vehicle interior, the FM transmission wave passes through, is reflected by, or is diffracted by the structure or the like. Whether the FM transmission wave passes through, is reflected by, or is diffracted by the structure or the like depends on a material of the structure or the like.

For example, in each of the front seat and the rear seat, metal or the like is used for a frame or the like, but cloth, synthetic leather, or the like is used for a surface portion, and urethane or the like is used for the inside. Among the FM transmission waves emitted to the front seat or the like, the FM transmission wave that does not hit the metal or the like of the frame or the like passes through the front seat or the like. The FM transmission wave that hits the metal or the like of the frame or the like is reflected by the metal or the like.

When a material of the bag 3d present in the presence allowable area 40 is a material that reflects the FM transmission wave, the FM transmission wave is reflected by the bag 3d.

As illustrated in FIG. 6, the FM reception wave which is the reflection wave of the FM transmission wave reflected by each of the occupants 3a, 3b, and 3c and the bag 3d is received by the reception antenna elements 12-1 to 12-4 when time to elapses after the FM transmission wave is emitted from the transmission antenna element 11-1 or 11-2.

At this time, there is a difference of $f_d$ between the frequency of the FM transmission wave and the frequency of the FM reception wave. The frequency difference $f_d$ increases in proportion to a distance between the radio wave sensor 2 and the occupants 3a, 3b, and 3c and the like as reflection objects.

Figure 7:
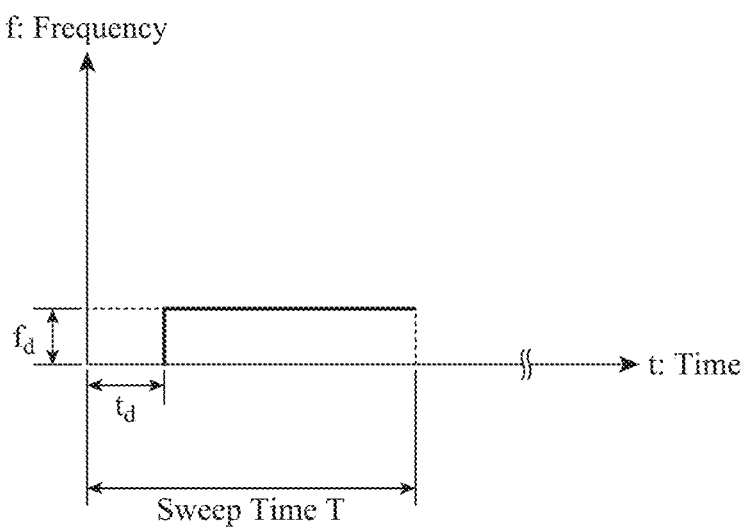
FIG. 7 is an explanatory diagram illustrating a relationship between a sweep time T of an FM transmission wave and a frequency difference $f_d$.

FIG. 7 is an explanatory diagram illustrating a relationship between the sweep time T of an FM transmission wave and the frequency difference $f_d$.

When receiving the FM reception wave which is a reflection wave, the reception antenna element 12-m (m=1, 2, 3, or 4) outputs a reception signal Rx(k) of the FM reception wave to the reception circuit 16-m.

The reception circuit 16-m extracts a frequency difference $f_d(k)$ which is a difference between the frequency of the FM signal Tx(k) output from the high frequency signal generating circuit 14 and the frequency of the reception signal Rx(k) output from the reception antenna element 12-m.

The reception circuit 16-m generates an intermediate frequency signal $IF_m(k)$ having the frequency difference $f_d(k)$, and outputs the intermediate frequency signal $IF_m(k)$ to the A/D conversion circuit 17.

When receiving the intermediate frequency signal $IF_m(k)$ from the reception circuit 16-m (m=1, 2, 3, or 4), the A/D conversion circuit 17 converts the intermediate frequency signal $IF_m(k)$ from an analog signal to a digital signal $D_m(k)$.

The A/D conversion circuit 17 outputs the digital signal $D_m(k)$ to the occupant detection unit 18.

The occupant detection unit 18 acquires the digital signal $D_m(k)$ (m=1, 2, 3, or 4) from the A/D conversion circuit 17.

The occupant detection unit 18 detects the occupants 3a, 3b, and 3c present in the presence allowable area 40 on the basis of the digital signal $D_m(k)$ (m=1, 2, 3, or 4), and identifies positions where the occupants 3a, 3b, and 3c are sitting.

Since the occupant detection processing or the like is a known technique, detailed description thereof is omitted, but an example of the occupant detection processing by the occupant detection unit 18 will be briefly described below.

The occupant detection unit 18 performs Fourier transform on the digital signal $D_m(k)$ every time the occupant detection unit 18 acquires the digital signal $D_m(k)$ (m=1, 2, 3, or 4) from the A/D conversion circuit 17.

The occupant detection unit 18 calculates a first frequency spectrum $Sp_1$ by combining Fourier transform results of the four digital signals $D_1(k)$ to $D_4(k)$.

By the digital signal $D_m(k)$ being subjected to Fourier transform, a spectrum value of the reception signal $Rx(k)$ (k=1, . . . , or K) of the reflection wave from a reflection object such as the occupants 3a, 3b, and 3c or the bag 3d is integrated into a beat frequency $F_{S1,n}$ (n=1, . . . , or N) indicated in the following formula (1). In a case where the occupants in the vehicle 1 are the three occupants 3a, 3b, and 3c, and a reflection object that reflects the FM transmission wave, other than the occupants is only the bag 3d, N=4. Here, in order to simplify the description, a reflection wave reflected by a door or the like of the vehicle is ignored.

A signal intensity of the beat frequency $F_{S1,n}$ is higher than a signal intensity of a frequency other than the beat frequency $F_{S1,n}$, and is a peak value of the first frequency spectrum $Sp_1$.

$$Fs_{1,n} = \frac{2BW \cdot R_n}{c \cdot T} \quad (1)$$

In formula (1), $R_n$ represents a distance between the radio wave sensor 2 and the occupants 3a, 3b, and 3c or the bag 3d, and $c$ represents a radio wave propagation speed.

The occupant detection unit 18 searches for the beat frequency $F_{S1,n}$ at which the signal intensity is a peak value from the first frequency spectrum $Sp_1$.

The occupant detection unit 18 calculates the distance $R_n$ by putting the beat frequency $F_{S1,n}$ obtained by the search into formula (1).

Every time the occupant detection unit 18 calculates the first frequency spectrum $Sp_1$, the occupant detection unit 18 calculates a second frequency spectrum $Sp_2$ by performing Fourier transform on the first frequency spectrum $Sp_1$ in a time direction of the FM transmission wave periodically emitted from the transmission antenna 11.

By the first frequency spectrum $Sp_1$ being subjected to Fourier transform in the time direction of the FM transmission wave, a spectrum value of the reception signal $Rx(k)$ (k=1, . . . , or K) of the reflection wave from the reflection object is integrated into a beat frequency $F_{S2,n}$ indicated in the following formula (2), corresponding to a relative speed $v_n$ between the radio wave sensor 2 and the reflection object.

A signal intensity of the beat frequency $F_{S2,n}$ is higher than a signal intensity of a frequency other than the beat frequency $F_{S2,n}$, and is a peak value of the second frequency spectrum $Sp_2$.

$$Fs_{2,n} = \frac{2f_0 \cdot v_n}{c} \quad (2)$$

In formula (2), $f_0$ represents a center frequency of the FM signal $Tx(k)$.

The occupant detection unit 18 searches for the beat frequency $F_{S2,n}$ at which the signal intensity is a peak value from the second frequency spectrum $Sp_2$.

The occupant detection unit 18 calculates the relative speed $v_n$ by putting the beat frequency $F_{S2,n}$ obtained by the search into formula (2).

Positions where the reception antenna elements 12-1 to 12-4 are arranged in the vehicle width direction of the vehicle 1 are different from each other. Therefore, even for reflection waves from the same reflection object, for example, a propagation distance until a reflection wave reaches the reception antenna element 12-1 is different from a propagation distance until a reflection wave reaches the reception antenna element 12-m (m=2, 3, or 4). Therefore, for example, a phase difference $\Delta\varphi$ as illustrated in the following formula (3) is generated between a phase of the FM reception wave received by the reception antenna element 12-1 and a phase of the FM reception wave received by the reception antenna element 12-m (m=2, 3, or 4).

$$\Delta\phi = \frac{2\pi d_x \cdot \sin(\theta_{x,n})}{\lambda} \quad (3)$$

In formula (3), $d_x$ represents a gap between the reception antenna elements 12-1 to 12-4 in a direction parallel to the vehicle width direction, $\theta_{x,n}$ represents an incident angle of the FM reception wave with respect to the reception antenna element 12-m on the x-z plane, and $\lambda$ represents a wavelength of the FM transmission wave.

The occupant detection unit 18 performs Fourier transform on the digital signal $D_m(k)$ every time the occupant detection unit 18 acquires the digital signal $D_m(k)$ (m=1, 2, 3, or 4) from the A/D conversion circuit 17.

The occupant detection unit 18 calculates a third frequency spectrum $Sp_{3,m}$ by combining Fourier transform results of the four digital signals $D_1(k)$ to $D_4(k)$.

Every time the occupant detection unit 18 calculates the third frequency spectrum $Sp_{3,m}$, the occupant detection unit 18 calculates a fourth frequency spectrum $Sp_{4,m}$ by performing Fourier transform on the third frequency spectrum $Sp_{3,m}$ in a time direction of the FM transmission wave emitted periodically.

Every time the occupant detection unit 18 calculates the fourth frequency spectrum $Sp_{4,m}$, the occupant detection unit 18 calculates a fifth frequency spectrum $Sp_5$ by performing Fourier transform on the fourth frequency spectrum $Sp_{4,m}$.

By the fourth frequency spectrum $Sp_{4,m}$ being subjected to Fourier transform in the vehicle width direction (direction parallel to the x axis) in which the reception antenna elements 12-1 to 12-4 are arranged, a spectrum value of the reception signal $Rx(k)$ (k=1, . . . , or K) of the reflection wave from the reflection object is integrated into a frequency component $F_{S5,n}$ corresponding to the incident angle $\theta_{x,n}$ on the x-z plane.

A signal intensity of the frequency component $F_{S5,n}$ is higher than a signal intensity of a frequency component other than the frequency component $F_{S5,n}$, and is a peak value of the fifth frequency spectrum $Sp_5$.

The occupant detection unit 18 searches for the frequency component $F_{S5,n}$ at which the signal intensity is a peak value from the fifth frequency spectrum $Sp_5$.

The occupant detection unit 18 calculates the incident angle $\theta_{x,n}$ on the x-z plane by putting the frequency component $F_{S5,n}$ obtained by the search into the following formula (4).

$$\theta_{x,n} = \sin^{-1}\left(\frac{Fs_{5,n} \cdot \lambda}{2\pi d_x}\right) \quad (4)$$

The radio wave sensor 2 illustrated in FIG. 3 includes the four reception antenna elements 12-1 to 12-4. In addition, the radio wave sensor 2 includes the two transmission antenna elements 11-1 and 11-2, and the transmission antenna element 11-1 and the transmission antenna element 11-2 alternately emit FM transmission waves. Therefore, in the radio wave sensor 2, as illustrated in FIG. 8, virtual antennas 12-1' to 12-8' equivalent to the four reception antenna elements 12-1 to 12-4 arranged in two rows in the vehicle height direction are formed.

Figure 8:
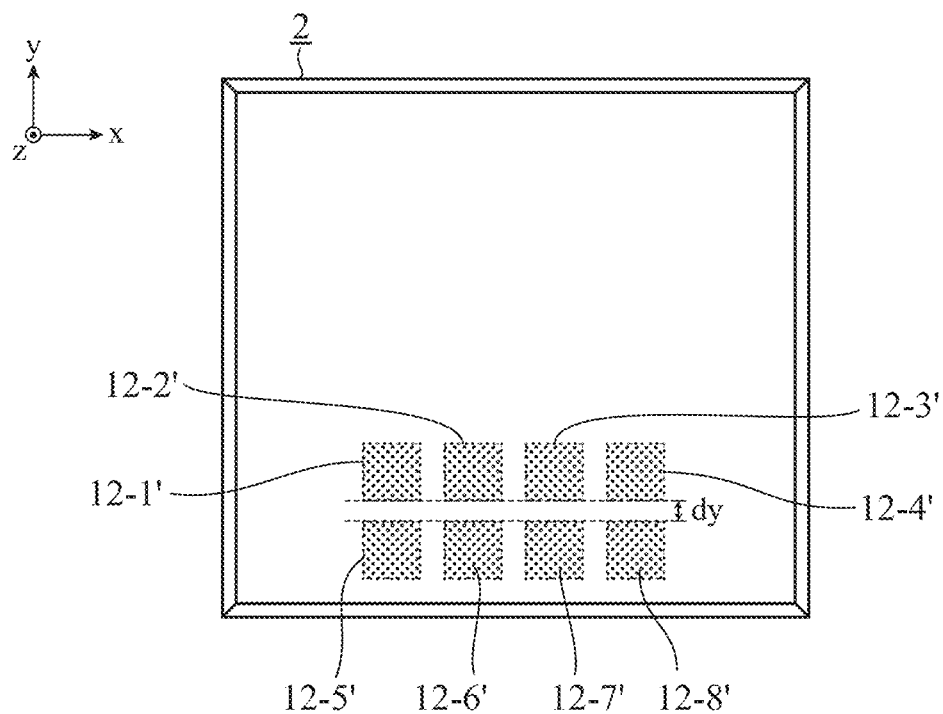
FIG. 8 is an explanatory diagram illustrating an example of virtual antennas 12-1' to 12-8' included in the radio wave sensor 2.

In the example of FIG. 8, the virtual antennas 12-1' to 12-4' and the virtual antennas 12-5' to 12-8' are arranged in the vehicle height direction.

A gap between the virtual antennas 12-1' to 12-4' and the virtual antennas 12-5' to 12-8' in the vehicle height direction is $d_y$.

FIG. 8 is an explanatory diagram illustrating an example of the virtual antennas 12-1' to 12-8' formed in the radio wave sensor 2.

The occupant detection unit 18 calculates an incident angle $\theta_{y,n}$ on the y-z plane by putting the frequency component $F_{S5,n}$ obtained by integration of a spectrum value of the reception signal Rx(k) by the fourth frequency spectrum $Sp_{4,m}$ being subjected to Fourier transform in the vehicle height direction (direction parallel to the y axis) in which the virtual antenna 12-1' or the like and the virtual antenna 12-5' or the like are arranged into the following formula (5).

$$\theta_{y,n} = \sin^{-1}\left(\frac{Fs_{5,n} \cdot \lambda}{2\pi d_y}\right) \quad (5)$$

Figure 9:
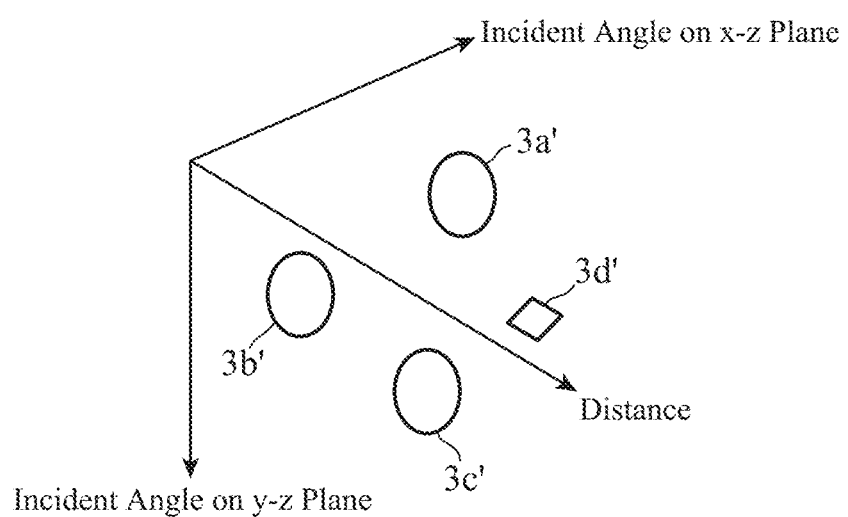
FIG. 9 is an explanatory diagram illustrating an example of a three-dimensional spatial distribution.

As illustrated in FIG. 9, the occupant detection unit 18 generates a three-dimensional spatial distribution having dimensions of the distance $R_n$, the incident angle $\theta_{x,n}$ on the x-z plane, and the incident angle $\theta_{y,n}$ on the y-z plane. Since processing itself for generating the three-dimensional spatial distribution is a known technique, detailed description thereof is omitted.

FIG. 9 is an explanatory diagram illustrating an example of the three-dimensional spatial distribution.

The three-dimensional spatial distribution includes a spatial distribution corresponding to each of the occupants 3a, 3b, and 3c (hereinafter, referred to as "occupant spatial distribution"), and a spatial distribution corresponding to the bag 3d which is a reflection object other than the occupants (hereinafter, referred to as "non-occupant spatial distribution").

An occupant spatial distribution 3a' is a spatial distribution corresponding to the occupant 3a, an occupant spatial distribution 3b' is a spatial distribution corresponding to the occupant 3b, and an occupant spatial distribution 3c' is a spatial distribution corresponding to the occupant 3c.

In addition, a non-occupant spatial distribution 3d' is a spatial distribution corresponding to the bag 3d.

In FIG. 9, the shapes of the occupant spatial distributions 3a', 3b', and 3c' and the non-occupant spatial distribution 3d' are deformed, and are different from actual shapes.

The occupant detection unit 18 determines whether the spatial distribution is the occupant spatial distribution or the non-occupant spatial distribution on the basis of the shape of the spatial distribution included in the three-dimensional spatial distribution.

A determination method based on the shape of the spatial distribution may be any method. For example, it may be determined whether the spatial distribution included in the three-dimensional spatial distribution is the occupant spatial distribution or the non-occupant spatial distribution using a learning model that has learned the shapes of the occupant spatial distribution and the non-occupant spatial distribution.

In addition, the occupant detection unit 18 may determine that the spatial distribution is the occupant spatial distribution when the relative speed $v_n$ corresponding to the spatial distribution included in the three-dimensional spatial distribution is, for example, larger than a threshold $Th_v$, and may determine that the spatial distribution is the non-occupant spatial distribution when the relative speed $v_n$ is equal to or less than the threshold $Th_v$. The threshold $Th_v$ may be stored in an internal memory of the occupant detection unit 18 or may be given from the outside of the radio wave sensor 2.

The bag 3d is generally stationary. Even when the occupant does not move a hand, a foot, or the like, the occupant is breathing, and thus there is a certain degree of movement.

When determining that the spatial distribution included in the three-dimensional spatial distribution is the occupant spatial distribution, the occupant detection unit 18 determines that an occupant is present in the presence allowable area 40.

In addition, when determining that the spatial distribution included in the three-dimensional spatial distribution is the occupant spatial distribution, the occupant detection unit 18 identifies the position of the occupant present in the occupant spatial distribution from the distance $R_n$, the incident angle $\theta_{x,n}$, and the incident angle $\theta_{y,n}$ related to the occupant spatial distribution. When the distance $R_n$ from the radio wave sensor 2, and the incident angle $\theta_{x,n}$ and the incident angle $\theta_{y,n}$ with respect to the radio wave sensor 2 are found, the position of the occupant can be identified.

In addition, the occupant detection unit 18 determines whether the occupants 3a, 3b, and 3c present in the vehicle interior are adults or children on the basis of the size of the occupant spatial distribution included in the three-dimensional spatial distribution.

A determination method based on the size of the occupant spatial distribution may be any method. For example, it may be determined whether the occupant is an adult or a child using a learning model that has learned the size of the occupant spatial distribution for each of an adult and a child.

The occupant detection unit 18 outputs detection data indicating detection results of the occupants 3a, 3b, and 3c present in the vehicle interior, positions where the occupants 3a, 3b, and 3c are sitting, and a determination result indicating whether or not the occupants 3a, 3b, and 3c are adults to the communication circuit 19.

The communication circuit 19 transfers the detection data output from the occupant detection unit 18 to a control unit (not illustrated) or the like in the vehicle interior via the interface unit 21 described later.

The control unit or the like can recognize presence or the like of the occupant by receiving the detection data. Therefore, for example, confinement of an occupant in the vehicle interior, leaving behind of an infant in the vehicle interior, and the like can be checked. In addition, a position where an infant or the like is sitting can be checked.

Figure 10:
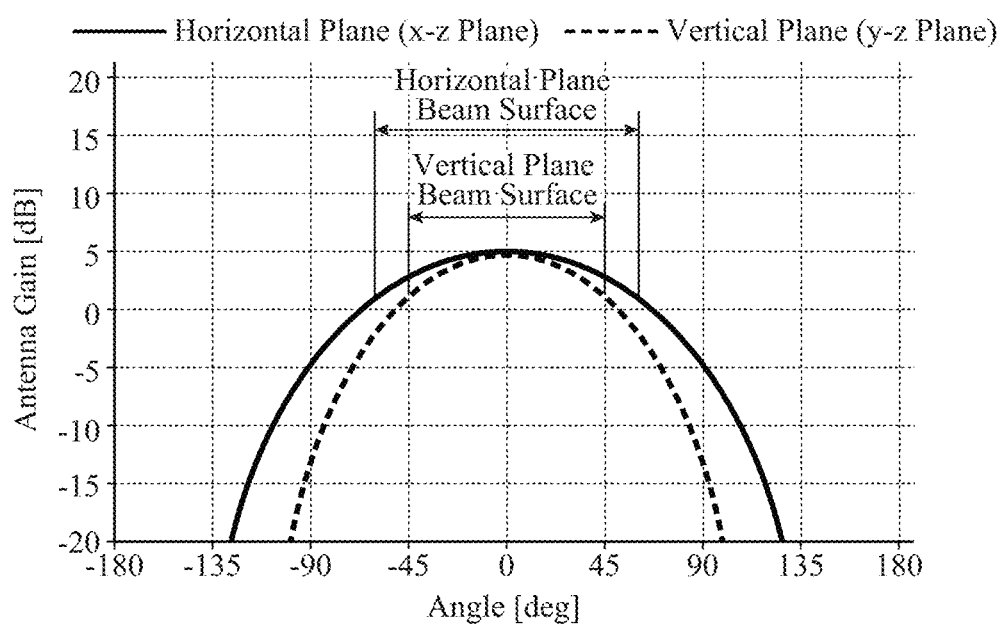
FIG. 10 is an explanatory diagram illustrating an example of antenna directivity characteristics of transmission antenna elements 11-1 and 11-2.

Here, FIG. 10 is an explanatory diagram illustrating an example of antenna directivity characteristics of the transmission antenna elements 11-1 and 11-2.

FIG. 10 illustrates an antenna gain with respect to a deviation angle of the transmission antenna element 11-1 or the like from the front direction. The horizontal axis represents an angle [deg] of the deviation angle, and the vertical axis represents an antenna gain [dB]. The front direction of the transmission antenna element 11-1 or the like has a deviation angle of 0 [deg].

The transmission antenna element 11-1 or the like has a characteristic in which a directivity gain peaks in the front direction, and the directivity gain decreases as the deviation angle from the front direction increases.

The antenna directivity characteristic on the x-z plane which is a horizontal plane and the antenna directivity characteristic on the y-z plane which is a vertical plane do not necessarily coincide with each other, and FIG. 10 illustrates an example in which the antenna directivity characteristic on the x-z plane and the antenna directivity characteristic on the y-z plane do not coincide with each other.

An angular range of a point falling by 3 [dB] from the peak of the directivity gain is referred to as a beam width of the transmission antenna element 11-1 or the like. The point falling by 3 [dB] from the peak of the directivity gain is a point at which transmission power decreases to ½ of the power at the peak. The beam width can be determined by design of the transmission antenna element 11-1 or the like, but has an upper limit and a lower limit.

An irradiation range 2a of a radio wave emitted from the transmission antenna element 11-1 or the like is determined by the antenna directivity characteristic of the transmission antenna element 11-1 or the like and the position where the radio wave sensor 2 is disposed in the vehicle interior.

In order for the occupant detection unit 18 to detect the occupants 3a, 3b, and 3c sitting on the seats, heads of the occupants 3a, 3b, and 3c including faces need to be included in the radio wave irradiation range 2a. In order to determine whether or not the occupants 3a, 3b, and 3c are adults, upper bodies of the occupants 3a, 3b, and 3c below the faces need to be included in the radio wave irradiation range 2a.

In order to cause the heads and the upper bodies of the occupants 3a, 3b, and 3c to be included in the radio wave irradiation range 2a, the radio wave sensor 2 is desirably disposed at a position closer to the ceiling than the heads of the occupants 3a, 3b, and 3c.

In addition, the presence allowable area 40 which is an area where an occupant can be present in the area in the vehicle interior of the vehicle 1 needs to be included in the radio wave irradiation range 2a. In order for the presence allowable area 40 to be included in the radio wave irradiation range 2a, the antenna directivity characteristic of the transmission antenna element 11-1 or the like is desirably a wide angle.

In addition, the reception antenna elements 12-1 to 12-4 each need to receive an FM reception wave which is a reflection wave from the head or the like of the occupant 3a or the like included in the radio wave irradiation range 2a. Therefore, the antenna directivity characteristic of the reception antenna element 12-1 or the like needs to be the same characteristic as the antenna directivity characteristic of the transmission antenna element 11-1 or the like. The same characteristic here does not mean that the antenna directivity characteristic of the reception antenna element 12-1 or the like is strictly the same as the antenna directivity characteristic of the transmission antenna element 11-1 or the like, and includes different characteristics within a range in which there is no practical problem.

When the FM transmission wave or an obstacle that blocks the FM reception wave is included in the radio wave irradiation range 2a, the antenna directivity characteristic of the transmission antenna element 11-1 or the like or the antenna directivity characteristic of the reception antenna element 12-1 or the like deteriorates. Therefore, the position where the radio wave sensor 2 is disposed is determined in such a manner that an obstacle is not included in the radio wave irradiation range 2a. Examples of the obstacle include a rear view mirror and a room lamp.

In the radio wave sensor 2 illustrated in FIG. 4, the radio wave sensor circuit unit 13 includes the occupant detection unit 18. However, this is merely an example, and as illustrated in FIG. 11, the occupant detection unit 18 may be mounted on a signal processing device or the like outside the radio wave sensor 2 without being included in the radio wave sensor circuit unit 13.

Figure 11:
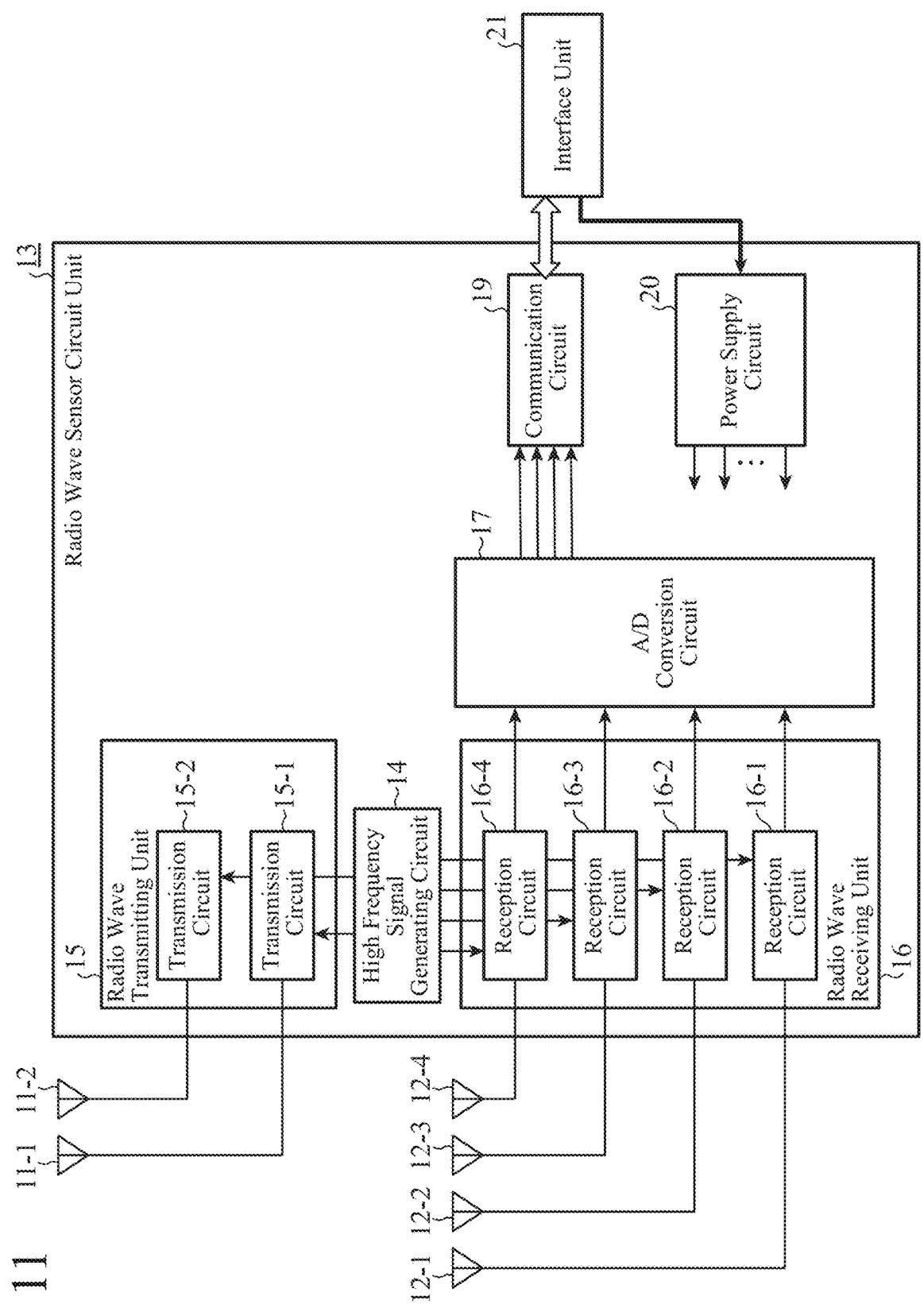
FIG. 11 is a block diagram illustrating a function of another radio wave sensor 2 according to the first embodiment.

FIG. 11 is a block diagram illustrating a function of another radio wave sensor 2 according to the first embodiment.

Figure 12:
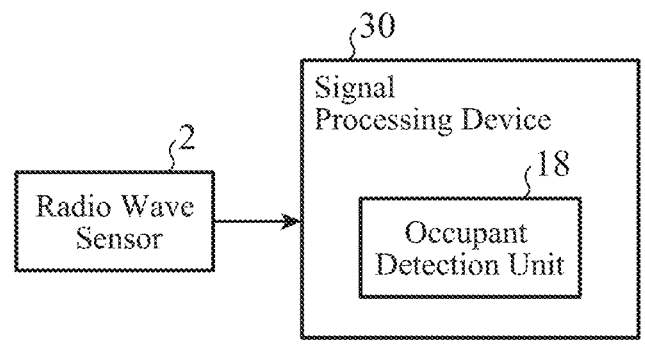
FIG. 12 is a configuration diagram illustrating an occupant detection device according to the first embodiment.

In the radio wave sensor 2 illustrated in FIG. 11, the radio wave sensor circuit unit 13 does not include the occupant detection unit 18, and the communication circuit 19 transmits a digital signal $D_m(k)$ (m=1, 2, 3, or 4) output from the A/D conversion circuit 17 to a signal processing device 30 illustrated in FIG. 12 via the interface unit 21.

FIG. 12 is a configuration diagram illustrating an occupant detection device according to the first embodiment.

The occupant detection device illustrated in FIG. 12 includes the radio wave sensor 2 illustrated in FIG. 11 and the occupant detection unit 18.

In the radio wave sensor 2 illustrated in FIG. 3, the reception antenna 12 includes the four reception antenna elements 12-1 to 12-4. However, this is merely an example, and the reception antenna 12 only needs to include a plurality of reception antenna elements, and the reception antenna 12 may include two reception antenna elements, three reception antenna elements, or five or more reception antenna elements.

The larger the number of reception antenna elements included in the reception antenna 12, the larger an area in which the reception antenna elements are arranged needs to be, but a resolution of the incident angle $\theta_{x,n}$ on the x-z plane is improved.

In the radio wave sensor 2 illustrated in FIG. 3, the transmission antenna 11 includes the two transmission antenna elements 11-1 and 11-2. However, this is merely an example, and the transmission antenna 11 may include only one transmission antenna element or three or more transmission antenna elements.

The larger the number of transmission antenna elements included in the transmission antenna 11, the larger an area in which the transmission antenna elements are arranged needs to be, but a resolution of the incident angle $\theta_{y,n}$ on the y-z plane is improved.

When the number of transmission antenna elements included in the transmission antenna 11 is one, the occupant detection unit 18 cannot calculate the incident angle $\theta_{y,n}$. When the occupant detection unit 18 cannot calculate the incident angle $\theta_{y,n}$, the occupant detection unit 18 cannot generate the above three-dimensional spatial distribution.

However, when the occupant detection unit 18 can calculate the incident angle $\theta_{x,n}$ on the x-z plane, the occupant detection unit 18 can generate a two-dimensional spatial distribution having dimensions of the distance $R_n$ and the incident angle $\theta_{x,n}$ on the x-z plane. When the occupant detection unit 18 can generate the two-dimensional spatial distribution, the occupant detection unit 18 can identify the positions of the occupants 3a, 3b, and 3c on the x-z plane.

In the radio wave sensor 2 illustrated in FIG. 3, the transmission antenna elements 11-1 and 11-2 are arranged in a line in the vehicle height direction of the vehicle. The positions where the transmission antenna elements 11-1 and 11-2 are arranged in the vehicle height direction only need to be different from each other, and as illustrated in FIG. 13, the transmission antenna elements 11-1 and 11-2 do not have to be arranged in a line in the vehicle height direction of the vehicle.

Figure 13:
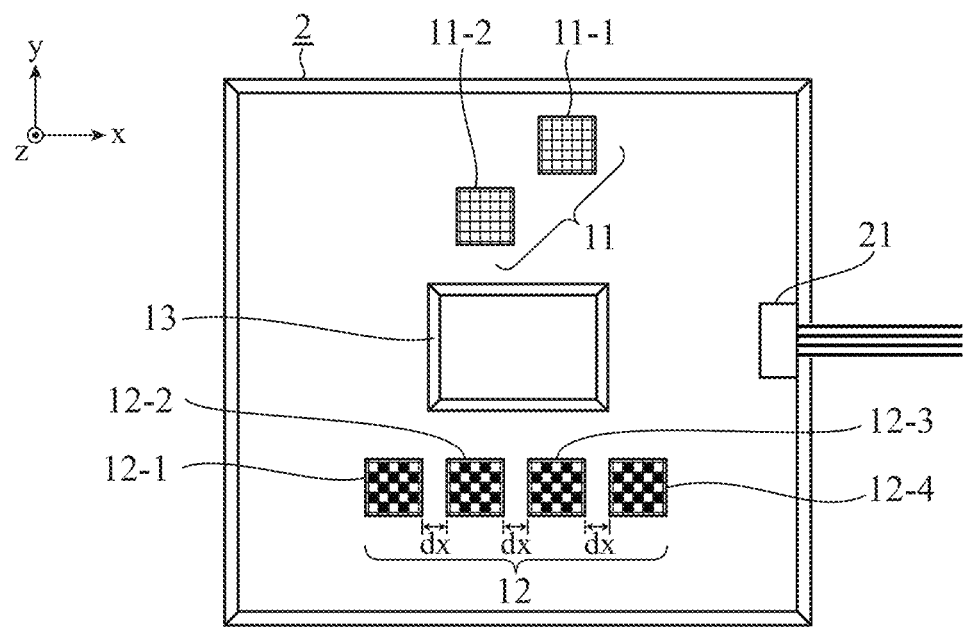
FIG. 13 is a configuration diagram illustrating another radio wave sensor 2 according to the first embodiment.

FIG. 13 is a configuration diagram illustrating another radio wave sensor 2 according to the first embodiment.

In the example of FIG. 13, the positions where the transmission antenna elements 11-1 and 11-2 are arranged in the vehicle height direction are different from each other, and the positions where the transmission antenna elements 11-1 and 11-2 are arranged in the vehicle width direction are different from each other.

In the radio wave sensor 2 illustrated in FIG. 3, the positions where the reception antenna elements 12-1 to 12-4 are arranged in the vehicle width direction are different from each other. However, this is merely an example, and as illustrated in FIG. 14, the positions where some of the reception antenna elements 12-1 to 12-4 are arranged in the vehicle width direction of the vehicle may be the same as the position where any one of the remaining reception antenna elements is disposed in the vehicle width direction of the vehicle.

Figure 14:
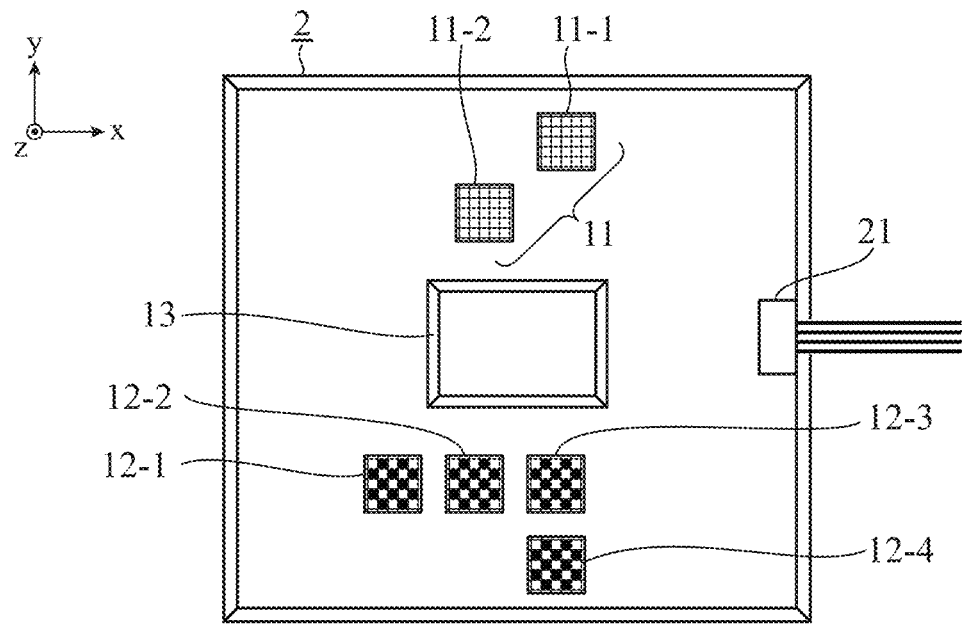
FIG. 14 is a configuration diagram illustrating another radio wave sensor 2 according to the first embodiment.

FIG. 14 is a configuration diagram illustrating another radio wave sensor 2 according to the first embodiment.

In the example of FIG. 14, the position where the reception antenna element 12-4 is disposed in the vehicle width direction is the same as the position where the reception antenna element 12-3 is disposed in the vehicle width direction. The position where the reception antenna element 12-4 is disposed in the vehicle height direction is different from each of the positions where the reception antenna elements 12-1 to 12-3 are arranged in the vehicle height direction.

In addition, the positions where the transmission antenna elements 11-1 and 11-2 are arranged in the vehicle height direction are different from each other, and the positions where the transmission antenna elements 11-1 and 11-2 are arranged in the vehicle width direction are different from each other.

In the radio wave sensor 2 illustrated in FIG. 3, the reception antenna elements 12-1 to 12-4 are arranged in a line in the vehicle width direction of the vehicle. The positions where the reception antenna elements 12-1 to 12-4 are arranged in the vehicle width direction only need to be different from each other, and as illustrated in FIG. 15, the reception antenna elements 12-1 to 12-4 do not have to be arranged in a line in the vehicle width direction of the vehicle.

Figure 15:
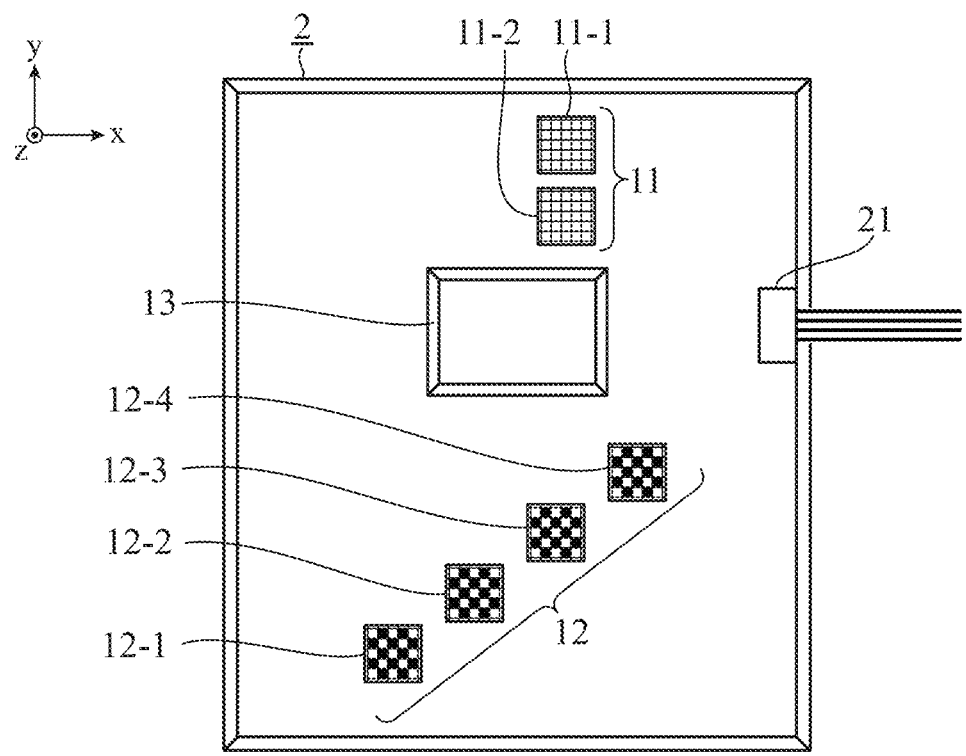
FIG. 15 is a configuration diagram illustrating another radio wave sensor 2 according to the first embodiment.

FIG. 15 is a configuration diagram illustrating another radio wave sensor 2 according to the first embodiment.

In the example of FIG. 15, the positions where the reception antenna elements 12-1 to 12-4 are arranged in the vehicle width direction are different from each other, and the positions where the reception antenna elements 12-1 to 12-4 are arranged in the vehicle height direction are different from each other.

Figure 16:
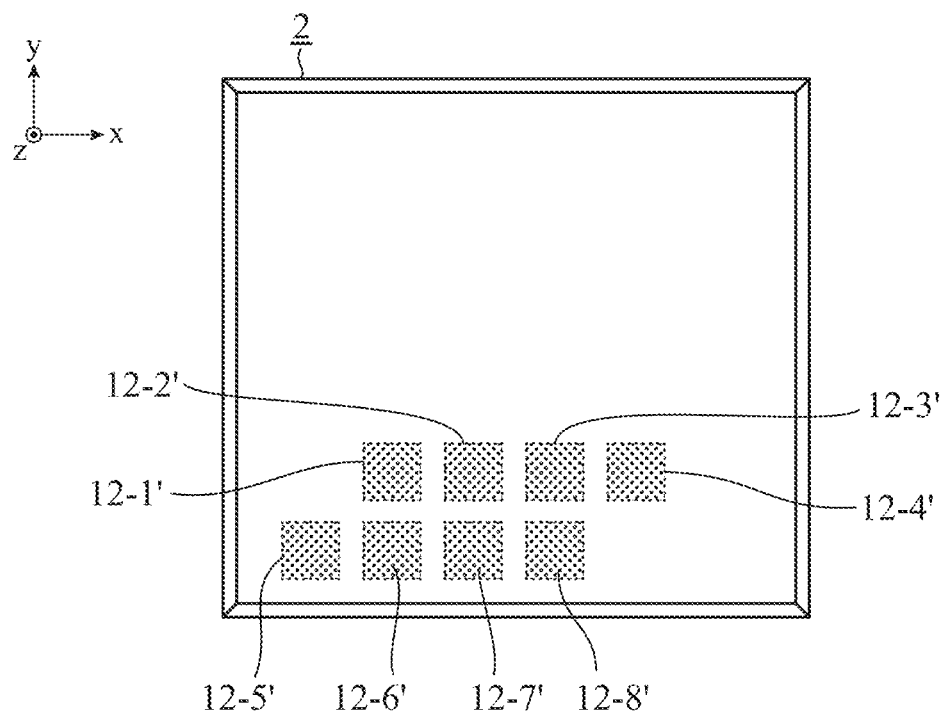
FIG. 16 is an explanatory diagram illustrating an example of virtual antennas 12-1' to 12-8' formed in the radio wave sensor 2.
Figure 17:
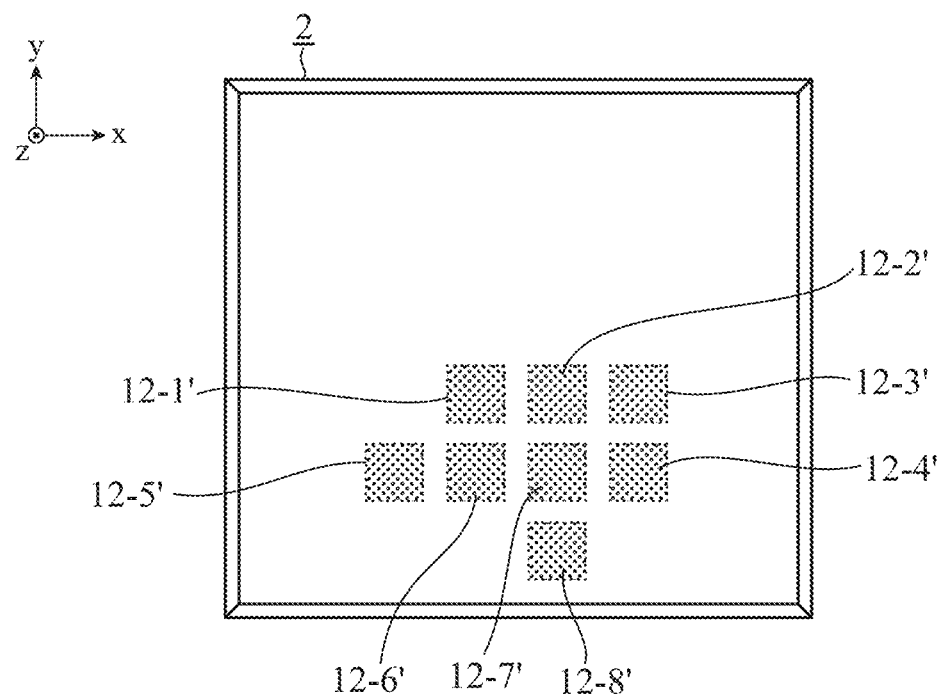
FIG. 17 is an explanatory diagram illustrating an example of the virtual antennas 12-1' to 12-8' formed in the radio wave sensor 2.
Figure 18:
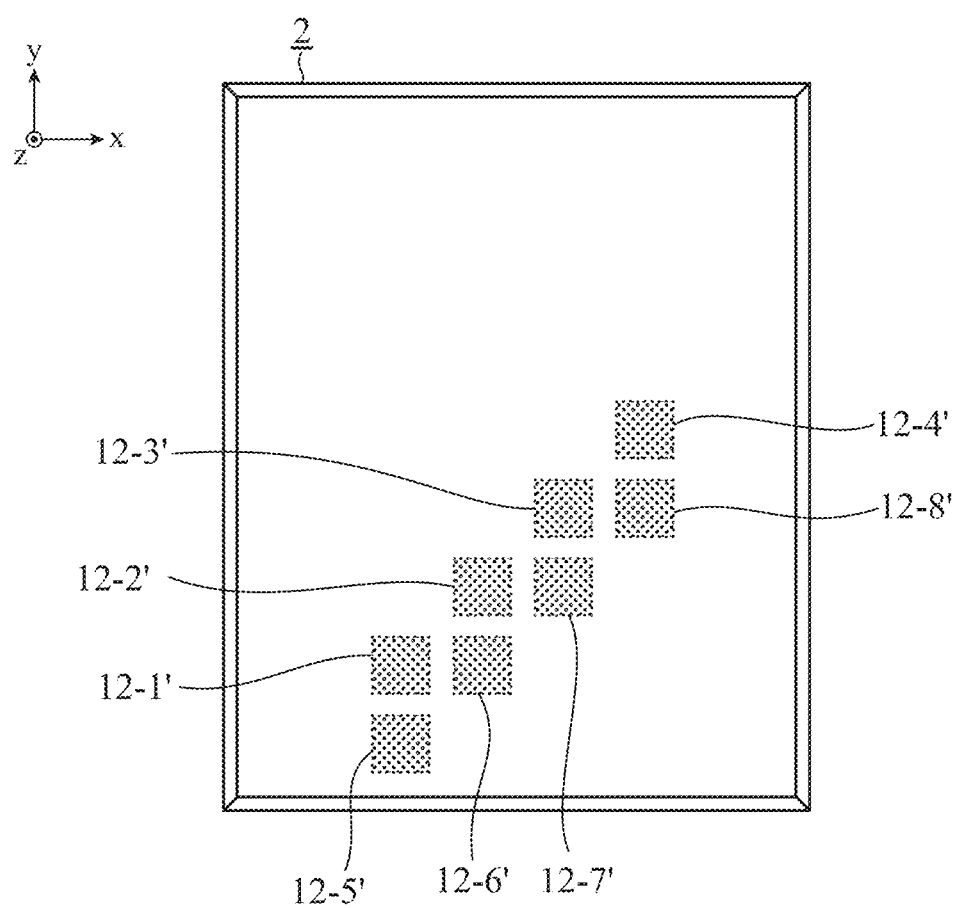
FIG. 18 is an explanatory diagram illustrating an example of the virtual antennas 12-1' to 12-8' formed in the radio wave sensor 2.

FIGS. 16, 17, and 18 are each an explanatory diagram illustrating an example of the virtual antennas 12-1' to 12-8' included in the radio wave sensor 2.

FIG. 16 illustrates an arrangement of the virtual antennas 12-1' to 12-8' in a case where the transmission antenna elements 11-1 and 11-2 are arranged as illustrated in FIG. 13.

FIG. 17 illustrates an arrangement of the virtual antennas 12-1' to 12-8' in a case where the transmission antenna elements 11-1 and 11-2 and the reception antenna elements 12-1 to 12-4 are arranged as illustrated in FIG. 14.

FIG. 18 illustrates an arrangement of the virtual antennas 12-1' to 12-8' in a case where the reception antenna elements 12-1 to 12-4 are arranged as illustrated in FIG. 15.

In a case where the transmission antenna elements 11-1 and 11-2 and the reception antenna elements 12-1 to 12-4 are arranged as illustrated in FIG. 14, among the virtual antennas 12-1' to 12-8', the three virtual antennas 12-2', 12-7', and 12-8' are arranged in the vehicle height direction, and an angular resolution is improved as compared with that of the radio wave sensor 2 illustrated in FIG. 3.

In the above first embodiment, the radio wave sensor 2 includes: the transmission antenna 11 that emits a radio wave toward the presence allowable area 40 which is an area in which an occupant can be present in an area in a vehicle interior of the vehicle 1; and the reception antenna 12 including the plurality of reception antenna elements 12-1 to 12-4 that receives a reflection wave of the radio wave emitted from the transmission antenna 11. The positions where the plurality of reception antenna elements 12-1 to 12-4 are arranged in the vehicle width direction of the vehicle 1 are different from each other. Therefore, the radio wave sensor 2 can detect all the occupants 3a, 3b, and 3c in the vehicle 1 and identify the positions of all the occupants 3a, 3b, and 3c.

Second Embodiment

In a second embodiment, the radio wave sensor 2 disposed at a position where an FM transmission wave emitted from the transmission antenna 11 is not directly emitted to the ceiling in the vehicle interior will be described.

Figure 19:
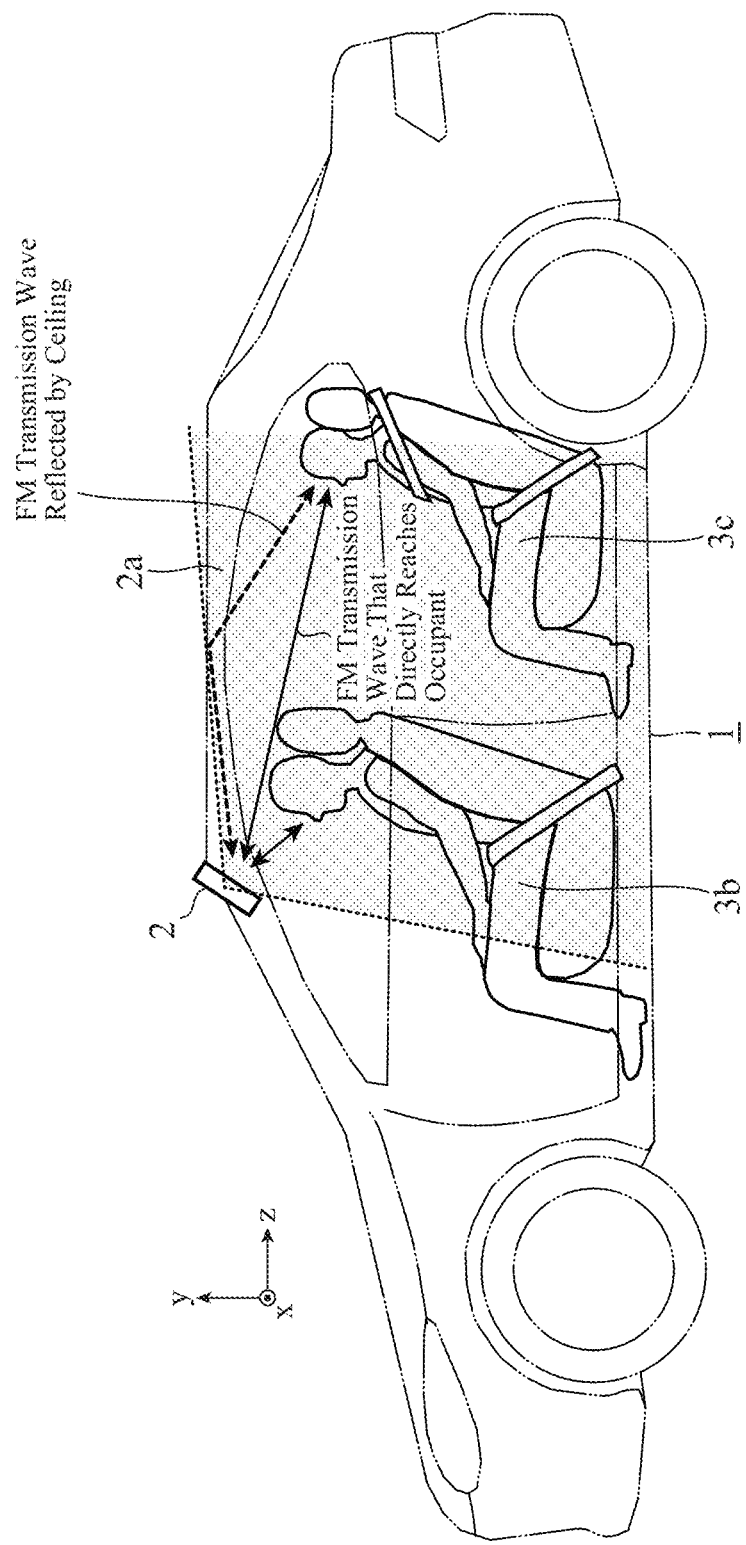
FIG. 19 is a side view illustrating a vehicle in a case where the radio wave sensor 2 is disposed at a position where an FM transmission wave emitted from the transmission antenna 11 is directly emitted to the ceiling in a vehicle interior.

When an FM transmission wave emitted from the transmission antenna 11 is directly emitted to the ceiling in the vehicle interior as illustrated in FIG. 19, an FM transmission wave that reaches the occupant 3c after being reflected by the ceiling is generated in addition to an FM transmission wave that directly reaches the occupant 3c from the transmission antenna 11. A route through which the FM transmission wave reaches the occupant 3c after being reflected by the ceiling is called a multipath, and is known to be a factor of deterioration of occupant detection performance in the occupant detection unit 18.

Therefore, the radio wave sensor 2 is desirably disposed in such a manner that the multipath is not generated. That is, as illustrated in FIG. 20, the radio wave sensor 2 is desirably disposed at a position where an FM transmission wave emitted from the transmission antenna 11 is not directly emitted to the ceiling in the vehicle interior.

FIG. 19 is a side view illustrating a vehicle in a case where the radio wave sensor 2 is disposed at a position where an FM transmission wave emitted from the transmission antenna 11 is directly emitted to the ceiling in the vehicle interior.

Figure 20:
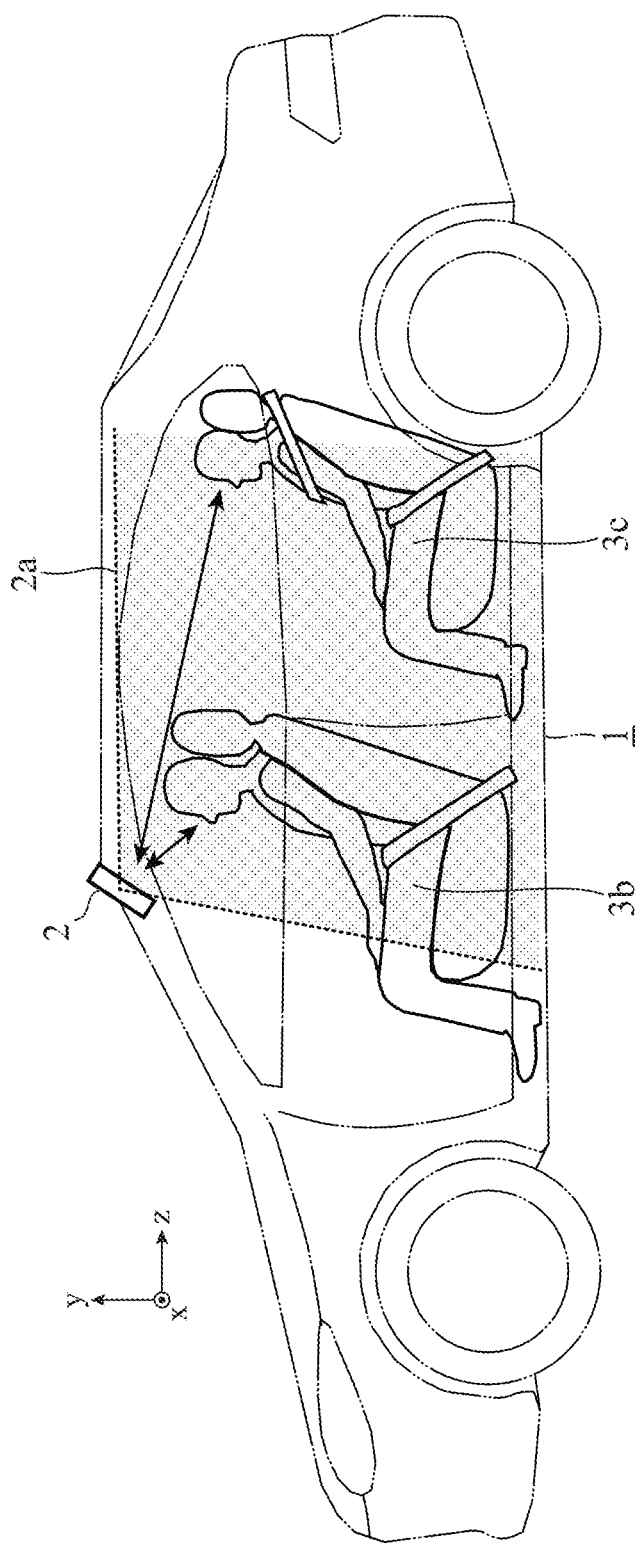
FIG. 20 is a side view illustrating a vehicle in a case where the radio wave sensor 2 is disposed at a position where an FM transmission wave emitted from the transmission antenna 11 is not directly emitted to the ceiling in a vehicle interior.

FIG. 20 is a side view illustrating a vehicle in a case where the radio wave sensor 2 is disposed at a position where an FM transmission wave emitted from the transmission antenna 11 is not directly emitted to the ceiling in the vehicle interior.

In a case where an FM transmission wave emitted from the transmission antenna 11 is directly emitted to the ceiling when the radio wave sensor 2 is disposed in the vehicle interior, an attachment angle of the radio wave sensor 2 may be adjusted in such a manner that the FM transmission wave emitted from the transmission antenna 11 is not directly emitted to the ceiling in the vehicle interior.

Figure 21:
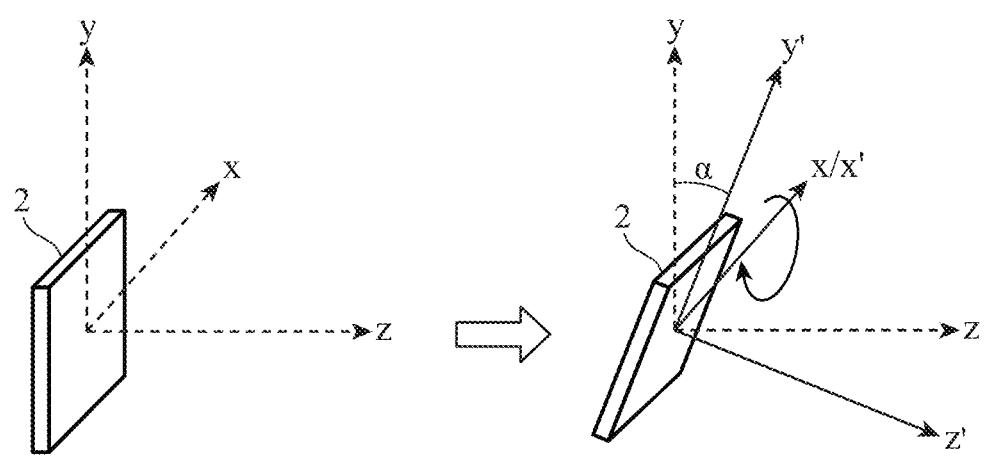
FIG. 21 is an explanatory diagram illustrating rotation of the radio wave sensor 2 in a y-z plane.

For example, as illustrated in FIG. 21, it is only required to dispose the radio wave sensor 2 in the vehicle interior in a state where the radio wave sensor 2 is rotated by, for example, an angle α in the y-z plane with the x axis of the coordinate system in the radio wave sensor 2 as a starting point. The angle α is an angle at which the FM transmission wave emitted from the transmission antenna 11 is not directly emitted to the ceiling in the vehicle interior.

FIG. 21 is an explanatory diagram illustrating rotation of the radio wave sensor 2 in the y-z plane.

In the radio wave sensor 2 illustrated in FIG. 3, the transmission antenna elements 11-1 and 11-2 are arranged in a line in the vehicle height direction of the vehicle 1, and the reception antenna elements 12-1 to 12-4 are arranged in a line in the vehicle width direction of the vehicle 1.

Figure 22:
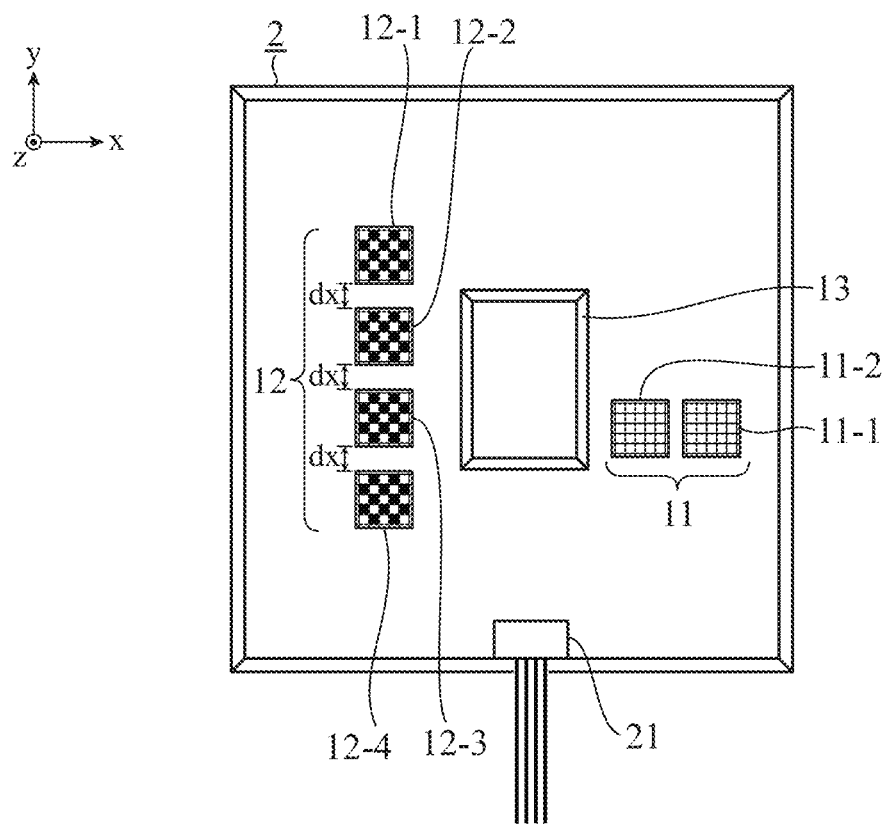
FIG. 22 is a configuration diagram illustrating the radio wave sensor 2 disposed in a state of being rotated clockwise by 90 degrees.

When the radio wave sensor 2 is disposed in a state of being rotated by 90 degrees on the x-y plane which is a plane including the vehicle width direction of the vehicle 1 and the vehicle height direction of the vehicle 1 as illustrated in FIG. 22, the positions where reception antenna elements 12-1 to 12-4 are arranged in the vehicle height direction of the vehicle 1 are different from each other. In addition, the positions where the transmission antenna elements 11-1 and 11-2 are arranged in the vehicle width direction of the vehicle 1 are different from each other.

FIG. 22 is a configuration diagram illustrating the radio wave sensor 2 disposed in a state of being rotated clockwise by 90 degrees.

In the example of FIG. 22, the radio wave sensor 2 is disposed in a state of being rotated clockwise by 90 degrees on the x-y plane.

Note that the present disclosure can freely combine the embodiments to each other, modify any constituent element in each of the embodiments, or omit any constituent element in each of the embodiments.

INDUSTRIAL APPLICABILITY

The present disclosure is suitable for a radio wave sensor and an occupant detection device.

REFERENCE SIGNS LIST

1: vehicle, 2: radio wave sensor, 2a: irradiation range, 3a, 3b, 3c: occupant, 3d: bag, 3a', 3b', 3c': occupant spatial distribution, 3d': non-occupant spatial distribution, 11: transmission antenna, 11-1, 11-2: transmission antenna element, 12: reception antenna, 12-1 to 12-4: reception antenna element, 12-1' to 12-8': virtual antenna, 13: radio wave sensor circuit unit, 14: high frequency signal generating circuit, 15: radio wave transmitting unit, 15-1, 15-2: transmission circuit, 16: radio wave receiving unit, 16-1 to 16-4: reception circuit, 17: A/D conversion circuit, 18: occupant detection unit, 19: communication circuit, 20: power supply circuit, 21: interface unit, 30: signal processing device, 40: presence allowable area

The invention claimed is:
1. A radio wave sensor comprising:
   a transmission antenna including a plurality of transmission antenna elements to emit a radio wave toward a presence allowable area which is an area in which an occupant is present in an area in a vehicle interior; and
   a reception antenna including a plurality of reception antenna elements to receive a reflection wave of the radio wave emitted from the transmission antenna, wherein
   positions of at least some of the plurality of transmission antenna elements are arranged at least in one direction between a vehicle height direction and a vehicle width direction, and
   positions of at least some of the plurality of reception antenna elements are arranged at least in other direction different from the one direction between the vehicle height direction and the vehicle width direction,
   wherein the radio wave sensor is configured to be attached to the vehicle interior such that a first end closer to a front end of the vehicle is located lower than a second end closer to a rear end of the vehicle, and
   a position of at least one of the plurality of transmission antenna elements located closer to the second end is higher than a position of another one of the plurality of transmission antenna elements located closer to the first end when attached to the vehicle.

2. The radio wave sensor according to claim 1, wherein the positions where at least some of the plurality of transmission antenna elements are arranged are different from each other in the one direction and the other direction, and
   positions where at least some of the plurality of reception antenna elements are arranged are different from each other at least in the other direction.

3. The radio wave sensor according to claim 1, wherein the positions where at least some of the plurality of transmission antenna elements are arranged are different from each other at least in the one direction, and
   the positions where at least some of the plurality of reception antenna elements are arranged are different from each other in the one direction and the other direction.

4. The radio wave sensor according to claim 1, wherein the positions where some of the plurality of reception antenna elements are arranged are different from each other at least in the other direction, and
   a position where any one of other reception antenna elements different from the some of the plurality of reception antenna elements is disposed is identical to a position where any one of the some of reception antenna elements is disposed in the other direction.

5. The radio wave sensor according to claim 1, comprising a radio wave transmitter to emit the radio wave from any of the plurality of transmission antenna elements to the presence allowable area, wherein
   the radio wave transmitter switches the transmission antenna elements to emit the radio wave.

6. The radio wave sensor according to claim 1, wherein the transmission antenna and the reception antenna are coplanar, and an antenna directivity characteristic of the transmission antenna is identical to an antenna directivity characteristic of the reception antenna.

7. The radio wave sensor according to claim 1, wherein the transmission antenna and the reception antenna are arranged at a ceiling in the vehicle interior or at a position closer to the ceiling than a head of an occupant present in the vehicle interior.

8. The radio wave sensor according to claim 1, wherein the radio wave sensor is disposed on a rear view mirror of the vehicle or a ceiling in the vehicle interior.

9. The radio wave sensor according to claim 1, wherein the radio wave sensor is disposed in a state of being rotated by a predetermined angle around an axis parallel to the vehicle width direction on a plane formed by an axis parallel to the vehicle height direction and an axis parallel to the vehicle length direction.

10. The radio wave sensor according to claim 1, wherein the transmission antenna is installed at a position where an obstacle that blocks the radio wave emitted toward the presence allowable area is not included in an irradiation range of the radio wave.

11. The radio wave sensor according to claim 1, wherein the transmission antenna is installed at a position where the radio wave emitted toward the presence allowable area is not directly emitted to a ceiling in the vehicle interior.

12. The radio wave sensor according to claim 1, further comprising an occupant detector to detect an occupant present in the presence allowable area on a basis of the radio wave received by the reception antenna and to identify a position where the occupant is sitting.

13. An occupant detection device comprising:
the radio wave sensor according to claim 12; and
an occupant detector to detect an occupant present in the presence allowable area on a basis of a radio wave received by the reception antenna included in the radio wave sensor and to identify a position where the occupant is sitting.

14. A radio wave sensor comprising:
a transmission antenna including a plurality of transmission antenna elements to emit a radio wave toward a presence allowable area which is an area in which an occupant is present in an area in a vehicle interior of a vehicle; and
a reception antenna including a plurality of reception antenna elements to receive a reflection wave of the radio wave emitted from the transmission antenna, wherein
at least two transmitting antenna elements among the plurality of transmission antenna elements and at least two reception antenna elements among the plurality of reception elements are arranged in a height direction of the vehicle,
wherein the radio wave sensor is configured to be attached to the vehicle interior such that a first end closer to a front end of a vehicle is located lower than a second end closer to a rear end of the vehicle, and
a position of at least one of the plurality of transmission antenna elements located closer to the second end is higher than a position of another one of the plurality of transmission antenna elements located closer to the first end.

15. The radio wave sensor according to claim 1, wherein a position of the transmission antenna is higher in the vehicle height direction than a position the reception antenna.

16. The radio wave sensor according to claim 1, wherein a position of a transmission antenna element arranged at a highest position in the vehicle height direction among the plurality of transmission antenna elements is different from a position of a reception antenna element arranged at a highest position in the vehicle height direction among the plurality of transmission antenna elements.

17. The radio wave sensor according to claim 1, wherein
a position of at least one of the plurality of reception antenna elements located closer to the second end is higher than a position of another one of the plurality of reception antenna elements located closer to the first end.

18. The radio wave sensor according to claim 14, wherein
a position of at least one of the plurality of reception antenna elements located closer to the second end is higher than a position of another one of the plurality of reception antenna elements located closer to the first end.

19. A radio wave sensor comprising:
a transmission antenna including a plurality of transmission antenna elements to emit a radio wave toward a presence allowable area which is an area in which an occupant is present in an area in a vehicle interior of a vehicle; and
a reception antenna including a plurality of reception antenna elements to receive a reflection wave of the radio wave emitted from the transmission antenna, wherein
positions of at least some of the plurality of transmission antenna elements are arranged at least in one direction between a vehicle height direction and a vehicle width direction, and
positions of at least some of the plurality of reception antenna elements are arranged at least in other direction different from the one direction between the vehicle height direction and the vehicle width direction,
the transmission antenna and the reception antenna are arranged at a ceiling in the vehicle interior or at a position closer to the ceiling than a head of an occupant present in the vehicle interior,
one of the reception antenna elements with different installation positions in the vehicle height direction is higher than the position of the other reception antenna element in the vehicle height direction, and
one of the transmission antenna elements with different installation positions in the vehicle width direction is located closest to a passenger seat of the vehicle, and one of the other transmission antenna elements is located closest to a driver seat of the vehicle.

* * * * *